(12) United States Patent
Koike et al.

(10) Patent No.: US 7,705,506 B2
(45) Date of Patent: Apr. 27, 2010

(54) ROTARY ELECTRIC MACHINE AND STATOR COIL ROTARY ELECTRIC MACHINES

(75) Inventors: Akihito Koike, Kariya (JP); Shinichi Matsubara, Anjo (JP); Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 915 days.

(21) Appl. No.: 11/392,550

(22) Filed: Mar. 30, 2006

(65) Prior Publication Data

US 2006/0220488 A1   Oct. 5, 2006

(30) Foreign Application Priority Data

Mar. 30, 2005   (JP)   ............................. 2005-096657

(51) Int. Cl.
*H02K 3/00*   (2006.01)
(52) U.S. Cl. ..................... 310/179; 310/184; 310/198
(58) Field of Classification Search ................ 310/179, 310/184, 198
See application file for complete search history.

(56) References Cited

U.S. PATENT DOCUMENTS

| | | | |
|---|---|---|---|
| 6,617,723 | B1 | 9/2003 | Shichijyo |
| 6,784,583 | B2 | 8/2004 | Umeda |
| 6,800,974 | B2 | 10/2004 | Shichijyo |
| 2002/0036439 | A1 | 3/2002 | Ooiwa |
| 2002/0047445 | A1 | 4/2002 | Ooiwa |
| 2002/0063488 | A1 | 5/2002 | Ooiwa |
| 2002/0096963 | A1 | 7/2002 | Masegi |
| 2003/0102736 | A1 | 6/2003 | Shichijyo |
| 2004/0150284 | A1 * | 8/2004 | Umeda ...................... 310/179 |

FOREIGN PATENT DOCUMENTS

| | | |
|---|---|---|
| EP | 0 454 039 A1 | 10/1991 |
| EP | 1 179 880 A2 | 2/2002 |
| EP | 1 233 499 A2 | 8/2002 |
| JP | A-04-079742 | 3/1992 |
| JP | A 2002-247787 | 8/2002 |
| JP | A 2003-180048 | 6/2003 |

\* cited by examiner

*Primary Examiner*—Quyen Leung
*Assistant Examiner*—Naishadh N Desai
(74) *Attorney, Agent, or Firm*—Oliff & Berridge, PLC

(57) ABSTRACT

In a rotary electric machine, a first group of first and second sets of three-phase windings of a stator coil is disposed in part of substantially circumferentially spaced slots of a stator core, and a second group of third and fourth sets of three-phase windings of the stator coil is disposed in another part of the slots. The first to fourth sets include first to fourth three-phase windings, respectively. Output ends of the first to fourth three-phase windings and input ends of the second and fourth windings are disposed at one of opposing end surface sides of the stator core. The output ends of the first and second three-phase windings of the first and second sets included in the first group are separated from the output ends of the third and fourth three-phase windings of the third and fourth sets included in the second group.

9 Claims, 12 Drawing Sheets

US 7,705,506 B2

ROTARY ELECTRIC MACHINE AND STATOR COIL ROTARY ELECTRIC MACHINES

CROSS REFERENCE TO RELATED APPLICATIONS

This application is based on Japanese Patent Application 2005-096657 filed on Mar. 30, 2005. This application claims the benefit of priority from the Japanese Patent Application, so that the descriptions of which are all incorporated herein by reference.

FIELD OF THE INVENTION

The present invention relates to rotary electric machines installable in, for example, vehicles, such as passenger automobiles and trucks. In addition, the present invention relates to stator coils for rotary electric machines installable in vehicles, such as passenger automobiles and trucks.

BACKGROUND OF THE INVENTION

Rotary electric machines have been used for vehicles. One type of the rotary electric machines is disclosed in U.S. Pat. No. 6,784,583 corresponding to Japanese Unexamined Patent Publication No. 2002-247787. The rotary electric machine disclosed in the U.S. Patent Publication has a stator coil consisting of a pair of first and second sets of three-phase windings. The three-phase windings of the first set have junctions serially connected to each other in delta ($\Delta$) configuration, and the three-phase windings of the second set have output and input ends; these input ends are respectively connected in series to the junctions of the delta-connected three-phase windings of the first set.

Use of the above structured first and second sets of three-phase windings allows the number of turns of each winding to be freely set. For example, the number of turns of each winding of the first and second sets is different from that of turns of each winding of normally star-connected three-phase windings.

The U.S. Pat. No. 6,784,583 also discloses a stator coil having a configuration with first and second groups of first and second sets of three-phase windings. In this U.S. Patent Publication, a modification of the configuration such that the first group of the first and second sets of three-phase windings is shifted from the second group of those of three-phase windings by an electric angle of $\pi/6$ radian in phase is disclosed. This modification permits magnetic noise caused from the first and second groups of three-phase windings to decrease.

Another one type of the conventional rotary electric machines is disclosed in U.S. Pat. No. 6,800,974 and U.S. Pat. No. 6,617,723, which correspond to Japanese Unexamined Patent Publication No. 2003-180048. The rotary electric machine disclosed in these U.S. Patent Publications consists of first and second sets of normally star-connected three phase windings.

In the U.S. Pat. No. 6,784,583, wiring configuration of the three-phase windings of the first and second sets of the pair of the stator coil is schematically illustrated in FIG. 6 of the Patent Publication as an example. Specifically, in FIG. 6 of the Patent Publication, arrangement of connections between the junctions of the three-phase windings of the first set of the pair and the input ends of the three-phase windings of the second set thereof by leads is illustrated.

The U.S. Pat. No. 6,784,583, however, provides no specific examples of wiring configuration for the three-phase windings of the first and second sets of each of the first and second groups of the stator coil.

Accordingly, there is a need for providing such a specific example of wiring configuration for the three-phase windings of the first and second sets of each of the first and second groups of the stator coil in order to increase the usefulness of the stator coil set forth above.

Particularly, because the number of three-phase windings of the first and second sets of each of the first and second groups of the stator coil is larger than that of three-phase windings of the first and second sets of the pair of the stator coil, a more simplified wring configuration is needed.

SUMMARY OF THE INVENTION

In view of the background, an object of at least one aspect of the present invention is to simplify wiring configuration for tree-phase windings of first and second sets of each of first and second groups of a stator coil.

According to one aspect of the present invention, there is provided a rotary electric machine. The rotary electric machine includes a stator core having axially opposing end surfaces and a plurality of substantially circumferentially spaced slots, and a stator coil. The stator coil includes a first group of first and second sets of three-phase windings disposed in part of the slots. The first set includes first three-phase windings each with output ends. The output ends of the first three-phase winding are connected in series to each other to form delta configuration with junctions between the first three-phase windings. The second set includes second three-phase windings having output and input ends. The input ends are respectively connected in series to the junctions of the first three-phase windings. The stator coil includes a second group of third and fourth sets of three-phase windings disposed in another part of the slots. The third set includes third three-phase windings each with output ends. The output ends of the third three-phase winding are connected in series to each other to form delta configuration with junctions between the first three-phase windings. The fourth set includes fourth three-phase windings having output and input ends. The input ends are respectively connected in series to the junctions of the first three-phase windings. The output ends of the first to fourth three-phase windings and the input ends of the second and fourth windings are disposed at one of the opposing end surface sides of the stator core. The output ends of the first and second three-phase windings of the first and second sets included in the first group are separated from the output ends of the third and fourth three-phase windings of the third and fourth sets included in the second group.

According to another aspect of the present invention, there is provided a rotary electric machine. The rotary electric machine includes a stator core having axially opposing end surfaces and a plurality of substantially circumferentially spaced slots, and a stator coil. The stator coil includes a first group of first and second sets of three-phase windings disposed in part of the slots. The first set includes first three-phase windings each with output ends disposed respectively at first circumferential positions in opposition to the stator core. The output ends of the first three-phase winding are connected in series to each other to form delta configuration with junctions between the first three-phase windings. The second set includes second three-phase windings having output and input ends. The input ends are respectively connected in series to the junctions of the first three-phase windings. The stator coil includes a second group of third and fourth sets of three phase windings disposed in another part of the slots. The third set includes third three-phase windings each with output ends disposed respectively at first circumferential positions in opposition to the stator core. The output ends of the third three-phase winding are connected in series to each other to form delta configuration with junctions between the third three-phase windings. The fourth set includes fourth three-phase windings having output and input ends. The input ends are respectively connected in series to the junctions of the third three-phase windings. The output ends of the first to fourth three-phase windings and the input ends of the second and fourth windings are disposed at one of the opposing end surface sides of the stator core. The circumferential positions of the output positions of at least one of the first three-phase windings and the third three-phase windings are disposed to be included in the circumferential positions of the output ends of at least one of the second three-phase windings and the fourth three-phase windings.

According to a further aspect of the present invention, there is provided a stator coil to be provided in a stator core. The stator core has axially opposing end surfaces and a plurality of substantially circumferentially spaced slots. The stator coil includes a first group of first and second sets of three-phase windings disposed in part of the slots. The first set includes first three-phase windings each with output ends. The output ends of the first three-phase winding are connected in series to each other to form delta configuration with junctions between the first three-phase windings. The second set includes second three-phase windings having output and input ends. The input ends are respectively connected in series to the junctions of the first three-phase windings. The stator coil includes a second group of third and fourth sets of three-phase windings disposed in another part of the slots. The third set includes third three-phase windings each with output ends. The output ends of the third three-phase winding are connected in series to each other to form delta configuration with junctions between the third three-phase windings. The fourth set includes fourth three-phase windings having output and input ends. The input ends are respectively connected in series to the junctions of the third three-phase windings. The output ends of the first to fourth three-phase windings and the input ends of the second and fourth windings are disposed at one of the opposing end surface sides of the stator core. The output ends of the first and second three-phase windings of the first and second sets included in the first group are separated from the output ends of the third and fourth three-phase windings of the third and fourth sets included in the second group.

According to a still further aspect of the present invention, there is provided a stator coil. The stator coil includes a first group of first and second sets of three-phase windings disposed in part of the slots. The first set includes first three-phase windings each with output ends disposed respectively at first circumferential positions in opposition to the stator core. The output ends of the first three-phase winding are connected in series to each other to form delta configuration with junctions between the first three-phase windings. The second set includes second three-phase windings having output and input ends. The input ends are respectively connected in series to the junctions of the first three-phase windings. The stator coil includes a second group of third and fourth sets of three phase windings disposed in another part of the slots. The third set includes third three-phase windings each with output ends disposed respectively at first circumferential positions in opposition to the stator core. The output ends of the third three-phase winding are connected in series to each other to form delta configuration with junctions between the third three-phase windings. The fourth set includes fourth three-phase windings having output and input ends. The input ends are respectively connected in series to the junctions of the third three-phase windings. The output ends of the first to fourth three-phase windings and the input ends of the second and fourth windings are disposed at one of the opposing end surface sides of the stator core. The circumferential positions of the output positions of at least one of the first three-phase windings and the third three-phase windings are disposed to be included in the circumferential positions of the output ends of at least one of the second three-phase windings and the fourth three-phase windings.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

An embodiment of the present invention will be described hereinafter with reference to the accompanying drawings.

Figure 1:
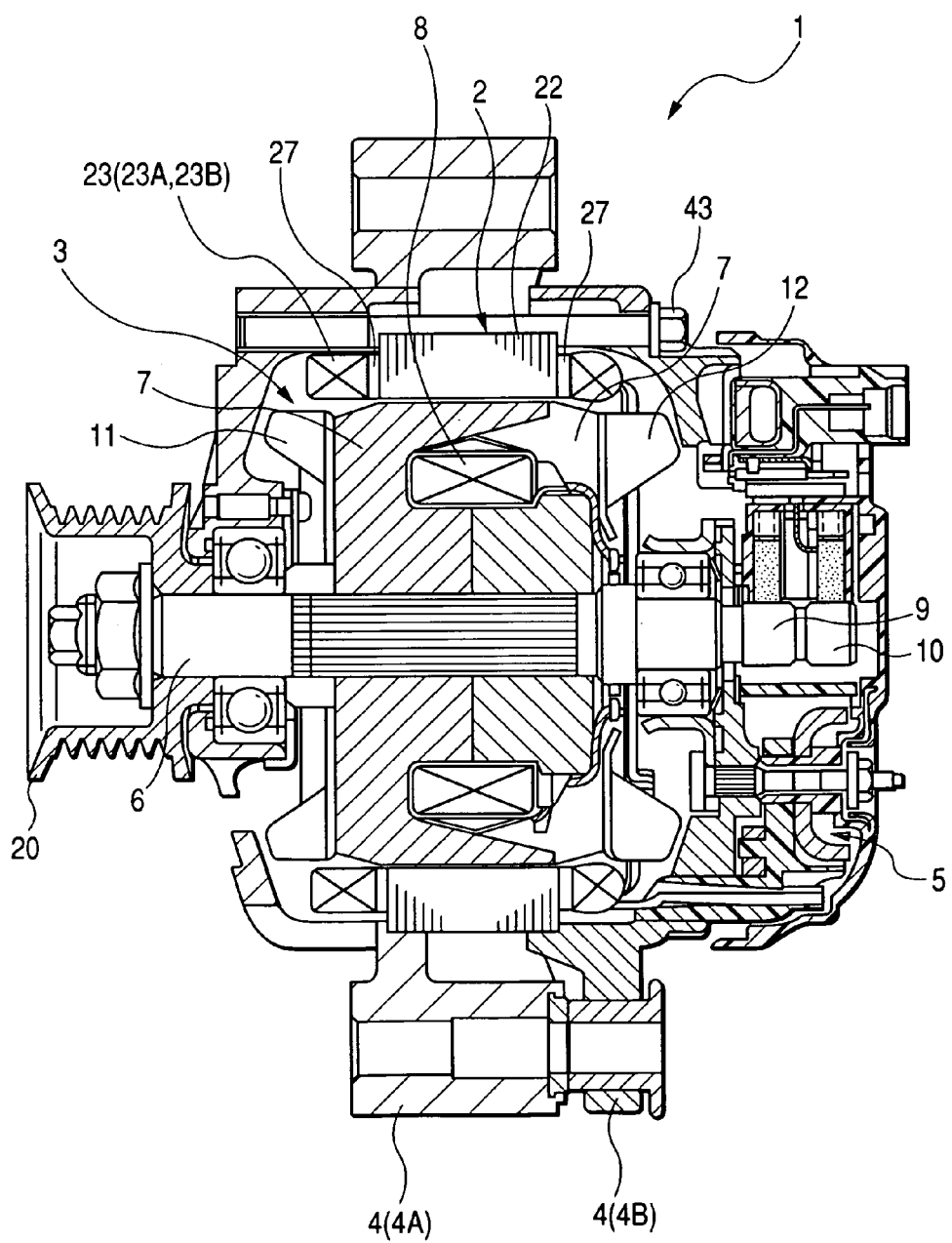
FIG. 1 is a partially axial sectional view illustrating an alternator according to an embodiment of the present invention.

Referring to the drawings, in which like reference characters refer to like parts in several views, particularly to FIG. 1, there is illustrated an alternator 1 for vehicles, as an example of rotary electric machines.

The alternator 1 installed in, for example, a vehicle includes a stator 2, a rotor 3, a frame 4, a refer assembly 5, a voltage regulator and so on.

The stator 2 is composed of a stator core 22. The stator core 22 has, for example, a substantially annular shape and first and second annular axial end surfaces. The stator core 22 also has a plurality of (e.g. 96) slots 24 (see FIGS. 5 to 7 and 10 to 13). For example, slot numbers of #1 to #96 are sequentially allocated in the 96 slots (see FIGS. 5 to 7). The slots 24 are formed through the stator core 22 and are circumferentially arranged at given intervals. The circumferential interval of adjacent slots defines a slot pitch corresponding to an electric angle of, for example, π/6 radian.

The stator core 22 is fixed to an inner peripheral wall of the frame 4. The stator 2 is also composed of a stator coil 23. The stator coil 23 is wound in the slots 24 of the stator core 22. The stator core 22 further has insulators 27 inserted between conductor portions of the stator coil 23 disposed in the slots 24 and inner peripheral surfaces of the slots 24 to insulate therebetween.

The stator coil 23 is composed of first and second groups 23A and 23B of first and second sets of three-phase windings. The second group 23B of first and second sets of three-phase windings is shifted by an electric angle of π/6 radian (30 degrees) in phase from the first group 23A of first and second sets of three-phase windings.

The stator coil 23 has first and second coil end portions CE1 and CE2 anally opposed to each other and projecting from the first and second axial end surfaces of the stator core 22. For example, ends of windings of each phase included in the first and second groups 23A and 23B are drawn out from one of the first and second coil end portions CE1 and CE2 of the stator coil 23. In the embodiment, ends of windings of each phase included in the first and second groups 23A and 23B are drawn out from the first coil end portion CE1 of the stator coil 23. Further details on each of the first and second groups 23A and 23B of first and second sets of three-phase windings will be described hereinafter.

The rotor 3 is attached to a rotary shaft 6 rotatably supported in the frame 4 by bearings so that it is disposed within the stator core 22. One end of the rotary shaft 6 is linked to a pulley 20 such that the rotary shaft 6 is rotatably driven by an engine (not shown) mounted in the vehicle through the pulley 20.

Specifically, the rotor 3 is composed of a Lundell type (claw pole) core 7. The Lundell type core 7 has a pair of opposing circuit plates axially assembled to the rotary shaft 6 and a plurality of claw portions extending from the outer peripheral side of the circular plates. The claw portions of one of the circuit plates and those of the other thereof are alternatively arranged in the circumferential direction of the rotor 3.

The rotor 3 is also composed of field windings 8 provided between the circular plates of the pole core 7, slip rings 9 and 10, and brushes. The slip rings 9 and 10 and the brushes are configured to provide electrical connections between the field windings 8 and a power supply. The rotor 3 is also composed of a diagonal flow cooling fan 11 and a centrifugal cooling fan 12 that allow cooling air to be delivered into the frame 4 by the rotation of the fans 11 and 12 together with that of the rotor 3. For example, the number of the claw portions is twelve, which corresponds to the number of poles of the rotor 3, and six slots of the stator core 22 correspond to each pole.

The frame 4 is configured to accommodate the stator 2 and the rotor 3 such that the stator core 22 is fixedly disposed around the outer periphery of the pole core 7 such that the inner periphery of the stator core 22 is opposite to the outer periphery of the pole core 7 with a predetermined air gap.

Specifically, the frame 4 is composed of a front frame 4A and a rear frame 4B, which are fastened to each other by a plurality of fastening bolts 43. This fastening structure fixedly supports the stator 2 in the frame 4.

The rectifier assembly 5 includes first and second rectifiers 5A and 5B, and the first and second rectifiers 5A and 5B are connected to six output leads extending from the first and second groups 23A and 23B of first and second sets of three-phase windings. The rectifier assembly 5 is configured to convert a three-phase AC (Alternating Current) voltage applied from the stator coil 23 into a DC voltage using both positive and negative half cycles of the three-phase AC voltage.

In the alternator 1 described above, a field current is applied to the field winding 8 through the slip rings 9 and 10 and the brushes while the field windings 8 of the rotor 3 is rotating based on torque applied from the engine through the pulley 20. In this situation, the field current flowing trough the field windings 8 magnetize the claw portions of one of the circuit plates to the north (N) pole, and those of the other thereof to the south (S) pole. The rotation of the alternately magnetized north and south poles create magnetic fluxes, and the created magnetic fluxes induce a three-phase AC voltage in the stator coil 23. The induced three-phase AC voltage is rectified by the rectifier 5, thereby generating a DC voltage. The voltage regulator is configured to control the field current flowing through the field windings 8 in response to the alternator output voltage.

Next, the stator 2 will be described in detail hereinafter.

Figure 2:
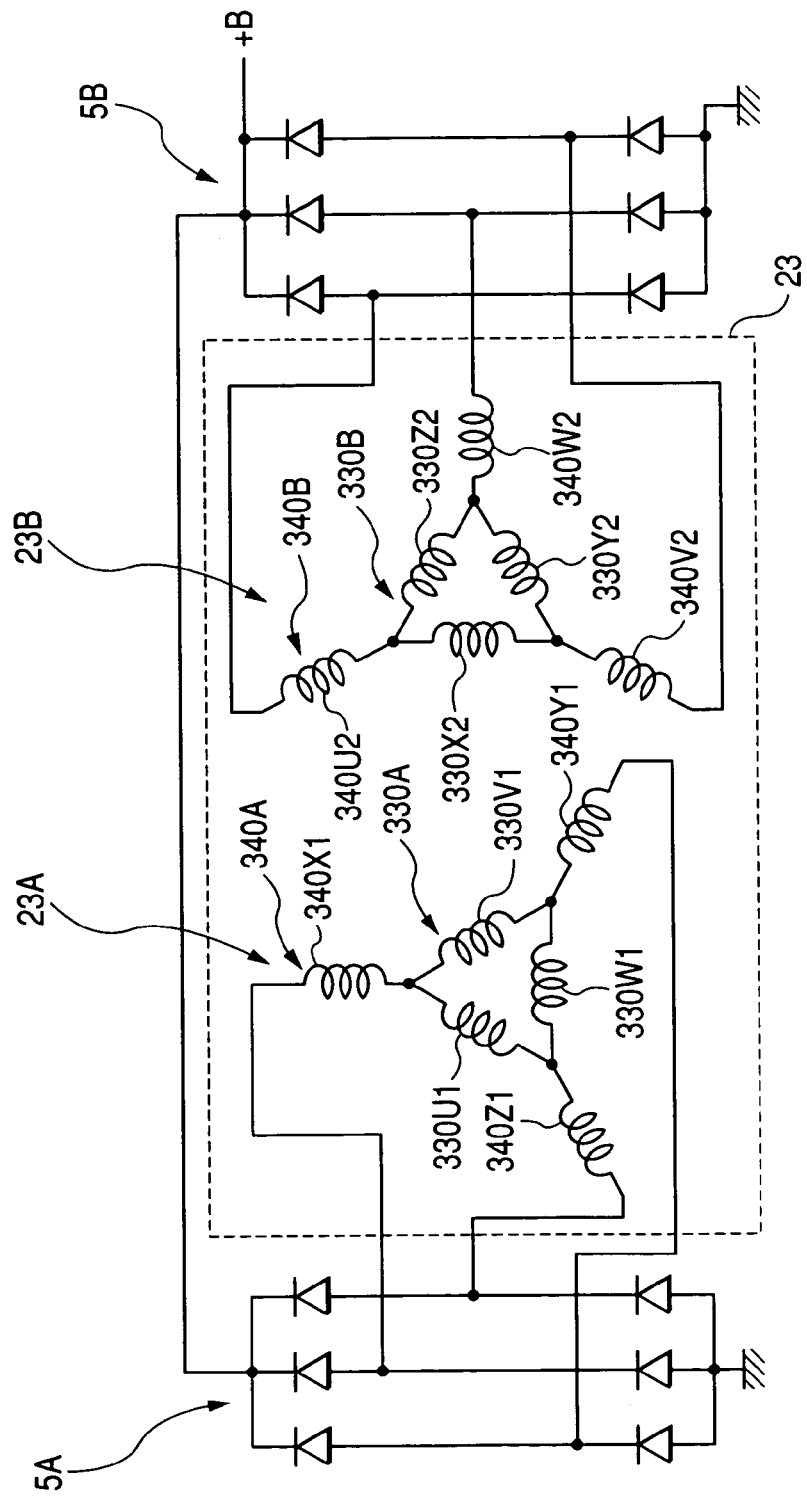
FIG. 2 is a wiring diagram of a stator coil according to the embodiment of the present invention.
Figure 3:
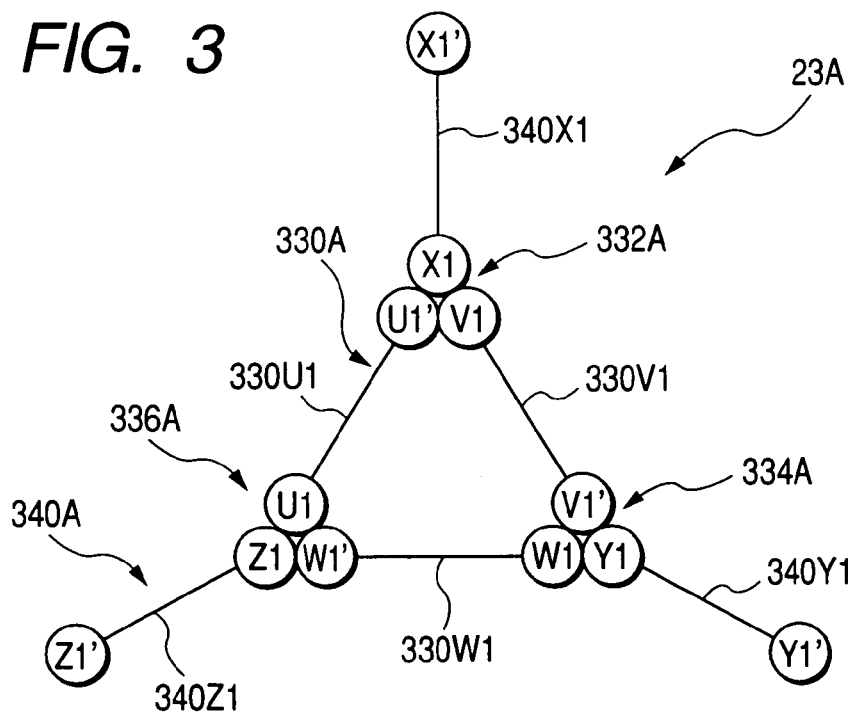
FIG. 3 is a supplementary wiring diagram of a first group of first and second sets of three-phase windings included in the stator coil.
Figure 4:
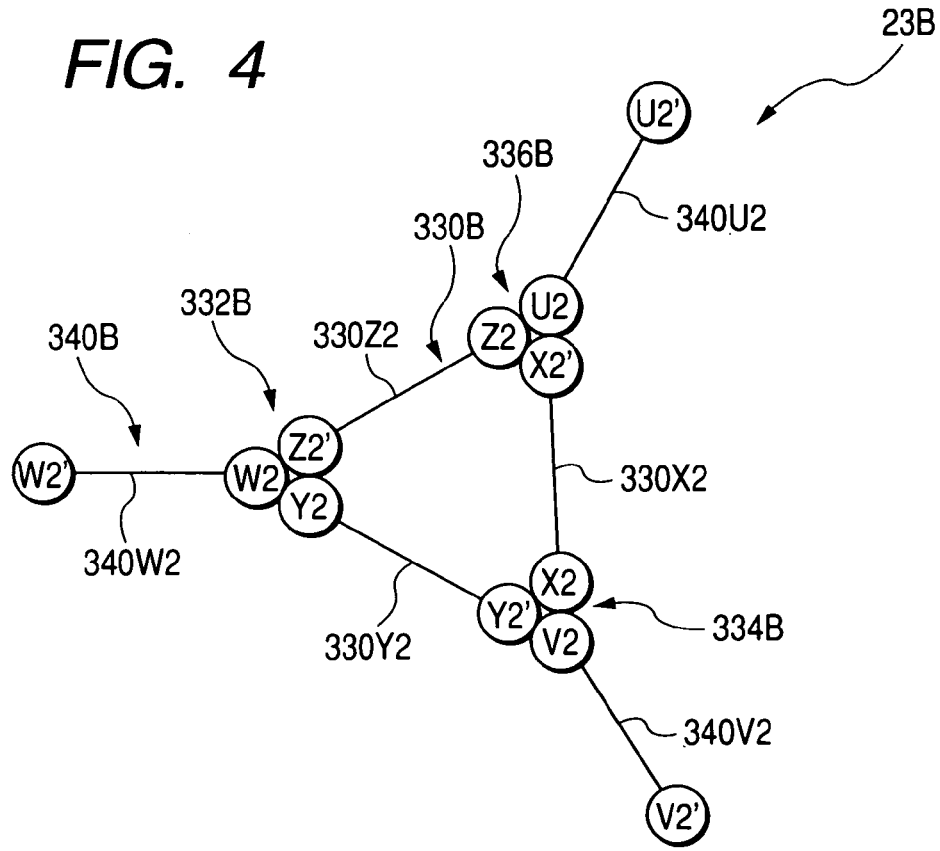
FIG. 4 is a supplementary wiring diagram of a second group of first and second sets of three-phase windings included in the stator coil.

As illustrated in FIGS. 2 to 4, the stator coil 23 of the stator 2 is composed of the first and second groups 23A and 23B of first and second sets of three-phase windings. The first group 23A consists of first and second sets 330A and 340A of three-phase windings.

The first set 330A includes a U-phase winding 330U1, a V-phase winding 330V1, and a W-phase winding 330W1 whose output ends are connected to each other in delta-configuration. The second set 340A includes an X-phase winding 340X1, a Y-phase winding 340Y1, and a Z-phase winding 340Z1 each having output and input ends. The input ends X1, Y1, and Z1 of the X-, Y-, and Z-phase windings 340X1, 340Y1, and 340Z1 of the second set 340A are respectively connected in series to the junctions (output ends) of the delta-connected U-, V-, and W-phase windings 330U1, 330V1, and 330W1 of the first set 330A. The output ends X1', Y1', and Z1' of the three-phase windings 340X1, 340Y1, and 340Z1 of the second set 340A serve respectively as output leads of the first group 23A.

The U-, V-, and W-phase winding 330U1, 330V1, and 330W1 are arranged to be shifted from each other by four slot pitches corresponding to an electric angle of 2π/3 radian, and connected to each other to form the delta-connected three-phase winding 330A.

Figure 5:
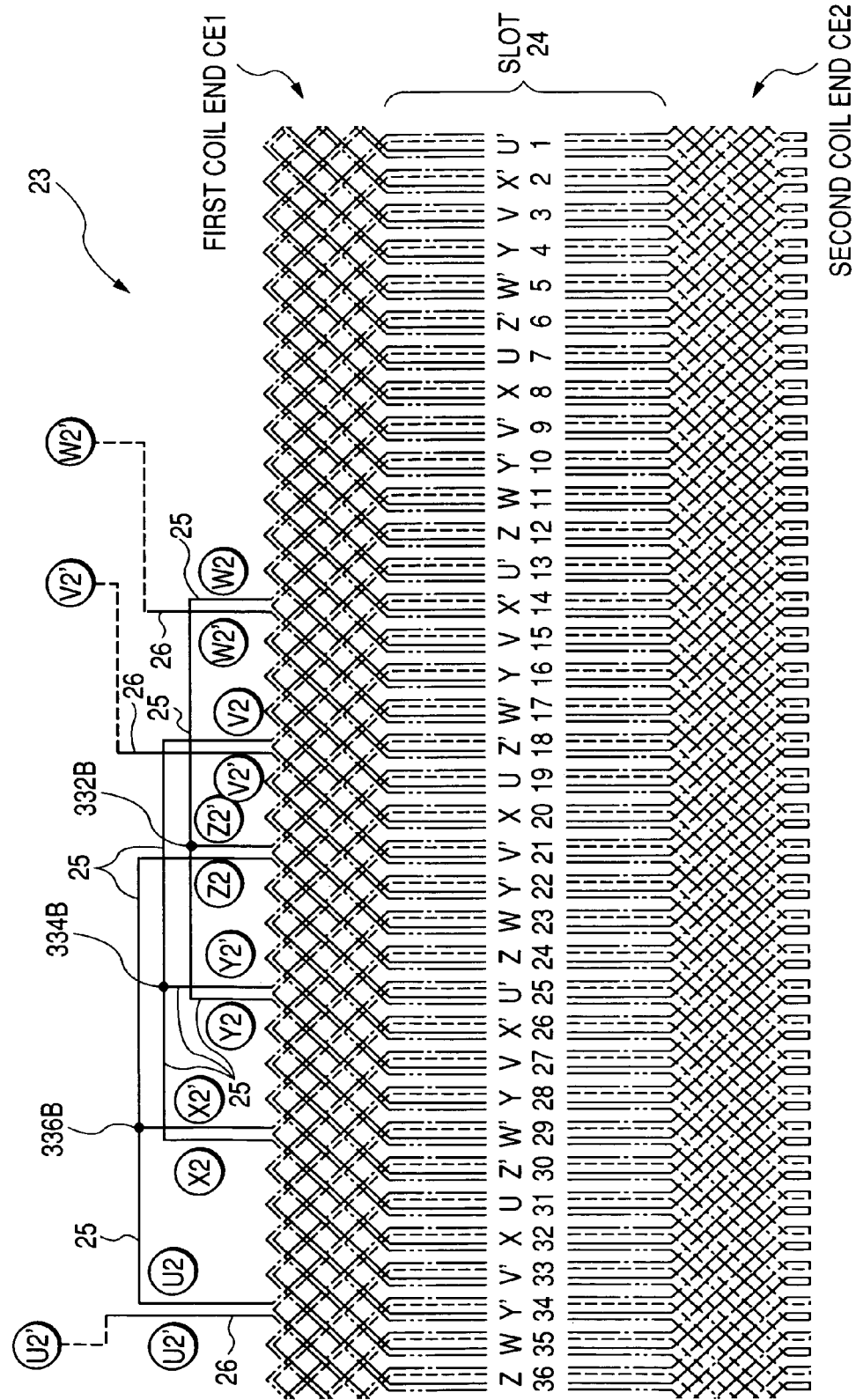
FIG. 5 is a winding diagram development of part of the stator coil according to the embodiment of the invention.
Figure 6:
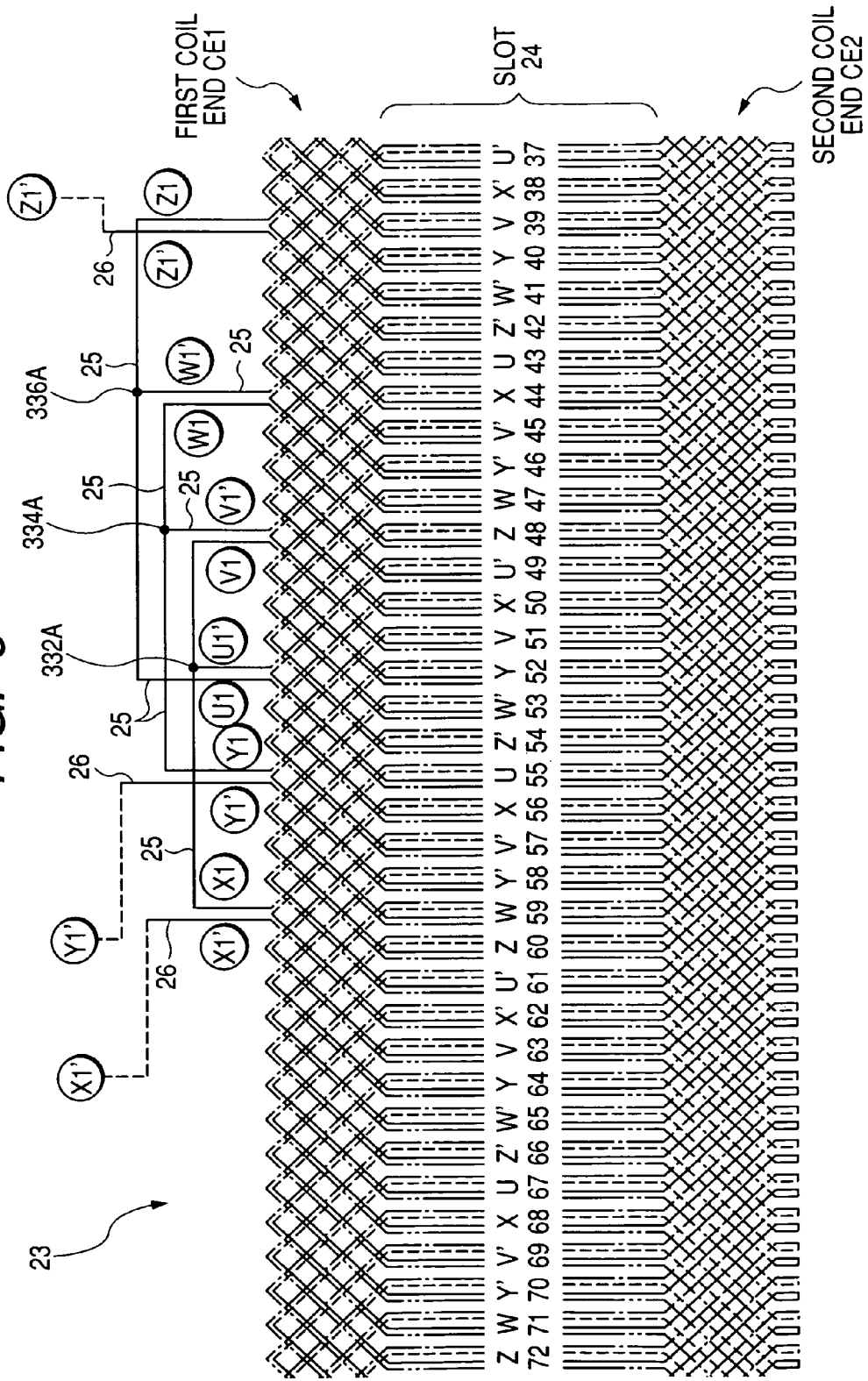
FIG. 6 is a winding diagram development of part of the stator coil according to the embodiment of the invention.
Figure 7:
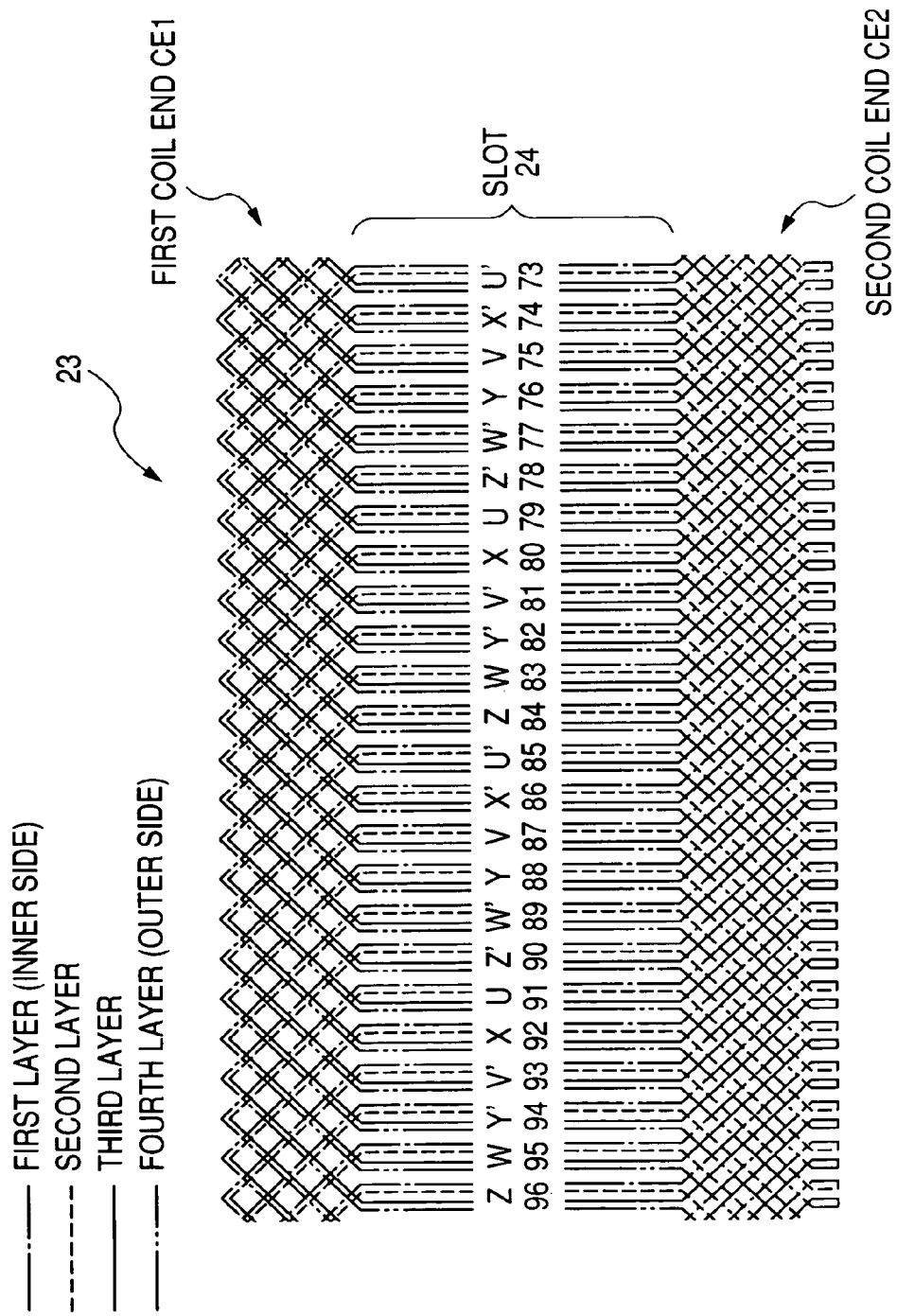
FIG. 7 is a winding diagram development of part of the stator coil according to the embodiment of the invention.

Each of the slots #1 to #96 includes a first layer to a fourth layer located from the inside to the outside of the stator core 22. In FIGS. 5 to 7, the first, second, third, and fourth layers are respectively illustrated schematically by chain, dashed, solid, and chain double-dashed lines.

Specifically, as illustrated in FIGS. 5 to 7, the U-phase winding 330U1 is disposed in slots #55, #61, #67, . . . every six slot pitches corresponding to one pole pitch. For example, part of the U-phase winding 330U1 being disposed in the slots #55 and #61 consists of:

a first portion inserted in the slot #55 at the fourth layer thereof, a second portion inserted in the slot #61 at the third layer thereof, a first turn portion continuously connecting between one end of the first portion projecting from the slot #55 at the second coil end portion side of the core 22 and that of the second portion projecting from the slot #61 thereat, a third portion inserted in the slot #55 at the second layer thereof, a second turn portion continuously connecting between the other end of the second portion projecting from the slot #61 at the first coil end side of the core 22 and one end of the third portion projecting from the slot #55 thereat, a fourth portion inserted in the slot #61 at the first layer thereof, and a third turn portion continuously connecting between the other end of the third portion projecting from the slot #55 at the second coil end portion side of the core 22 and one end of the fourth portion projecting from the slot #61 thereat.

Similarly, the V-phase winding 330V1 is inserted in slots #51, #57, #63, . . . every six slot pitches corresponding to one pole pitch; these slots #51, #57, #63, . . . are respectively shifted from slots #55, #61, #67, . . . by four slot pitches. The W-phase winding 330W1 is wound in slots #47, #53, #59, . . . every six slot pitches corresponding to one pole pitch; these slots #47, #53, #59 are respectively shifted from slots #51, #57, #63, . . . by four slot pitches.

The X-, Y-, and Z-phase windings 340X1, 340Y1, and 340Z1 are arranged to be shifted from each other by four slot pitches corresponding to the electric angle of $2\pi/3$ radian.

Specifically, as illustrated in FIGS. 5 to 7, the X-phase winding 340X1 is disposed in slots #62, #68, #74, . . . every six slot pitches corresponding to one pole pitch. Similarly, the Y-phase winding 340Y1 is inserted in slots #58, #64, #70, . . . every six slot pitches corresponding to one pole pitch; these slots #58, #64, #70, . . . are respectively shifted from slots #62, #68, #74, . . . by four slot pitches. The Z-phase winding 340Z1 is wound in slots #54, #60, #66, . . . every six slot pitches corresponding to one pole pitch; these slots #54, #60, #66, . . . are respectively shifted from slots #58, #64, #70, . . . by four slot pitches.

The first set 330A of the three-phase windings 330U1, 330V1, and 330W1 and the second set 340A of the three-phase windings 340X1, 340Y1, and 340Z1 are arranged to be shifted from each other by one slot pitch (the electric angle $\pi/6$).

The connection of the junctions of the delta-connected U-, V-, and W-phase windings 330U1, 330V1, and 330W1 to the input ends X1, Y1, and Z1 of the X-, Y-, and Z-phase windings 340X1, 340Y1, and 340Z1 is preferably welded to form three weld portions 332A, 334A, and 336A. This provides serial connection between the delta-connected first set 330A of three-phase windings and the second set 340A of three-phase windings. The output ends X1', Y1', and Z1' of the X-, Y-, and Z-phase windings 340X1, 340Y1, and 340Z1 are coupled to the first rectifier 5A.

The second group 23B consists of first and second sets 330B and 340B of three-phase windings.

The first set 330B includes an X-phase winding 330X2, a Y-phase winding 330Y2, and a Z-phase winding 330Z2, whose output ends are connected to each other in delta-configuration. The second set 340B includes a U-phase winding 340U2, a V-phase winding 340V2, and a W-phase winding 340W2 each having output and input ends. The input ends U2, V2, and W2 of the U-, V-, and W-phase windings 340U2, 340V2, and 340W2 of the second set 340B are respectively connected in series to the junctions (output ends) of the delta-connected X-, Y-, and Z-phase windings 330X2, 330Y2, and 330Z2 of the first set 330B. The output ends U2', V2', and W2' of the three-phase windings 340U2, 340V2, and 340W2 of the second set 340B serve respectively as output leads of the second group 23B.

The X-, Y-, and Z-phase winding 330X2, 330Y2, and 330X2 are arranged to be shifted from each other by four slot pitches corresponding to the electric angle of $2\pi/3$ radian, and connected to each other to form the delta-connected three-phase winding 330B.

Specifically, as illustrated in FIGS. 5 to 7, the X-phase winding 330X2 is disposed in slots #32, #38, #44, . . . every six slot pitches corresponding to one pole pitch. For example, part of the X-phase winding 330X2 being disposed in the slots #32 and #38 consists of:

a first portion inserted in the slot #32 at the fourth layer thereof, a second portion inserted in the slot #38 at the third layer thereof, a first turn portion continuously connecting between one end of the first portion projecting from the slot #32 at the second coil end portion side of the core 22 and that of the second portion projecting from the slot #38 thereat, a third portion inserted in the slot #32 at the second layer thereof, a second turn portion continuously connecting between the other end of the second portion projecting from the slot #38 at the first coil end side of the core 22 and one end of the third portion projecting from the slot #32 thereat, a fourth portion inserted in the slot #38 at the first layer thereof, and a third turn portion continuously connecting between the other end of the third portion projecting from the slot #32 at the second coil end portion side of the core 22 and one end of the fourth portion projecting from the slot #38 thereat.

Similarly, the Y-phase winding 330Y2 is inserted in slots #28, #34, #40, . . . every six slot pitches corresponding to one pole pitch; these slots #28, #34, #40, . . . are respectively shifted from slots #32, #38, #44, . . . by four slot pitches. The Z-phase winding 330Z2 is wound in slots #24, #30, #36, . . . every six slot pitches corresponding to one pole pitch; these slots #24, #30, #36, . . . are respectively shifted from slots #28, #34, #40, . . . by four slot pitches.

The U-, V-, and W-phase windings 340U2, 340V2, and 340W2 are arranged to be shifted from each other by four slot pitches corresponding to the electric angle of $2\pi/3$ radian.

Specifically, as illustrated in FIGS. 5 to 7, the U-phase winding 340U2 is disposed in slots #37, #43, #49, . . . every six slot pitches corresponding to one pole pitch. Similarly, the V-phase winding 340V2 is inserted in slots #33, #39, #45, . . . every six slot pitches corresponding to one pole pitch; these slots #33, #39, #45 are respectively shifted from slots #37, #43, #49, . . . by four slot pitches. The W-phase winding 340W2 is wound in slots #29, #35, #41, . . . every six slot pitches corresponding to one pole pitch; these slots #29, #35, #41 are respectively shifted from slots #33, #39, #45, . . . by four slot pitches.

The first set 330B of the three-phase windings 330X2, 330Y2, and 330Z2 and the second set 340B of the three-phase windings 340U2, 340V2, and 340W2 are arranged to be shifted from each other by one slot pitch corresponding to the electric angle of $\pi/6$.

The connection of the junctions of the delta-connected X-, Y-, and Z-phase windings 330X2, 330Y2, and 330Z2 to the input ends U2, V2, and W2 of the U-, V-, and W-phase windings 340U2, 340V2, and 340W2 is preferably welded to form three weld portions 332B, 334B, and 336B. This provides serial connection between the delta-connected first set 330B of three-phase windings and the second set 340B of three-phase windings. The output ends U2', V2', and W2' of the U-, V-, and W-phase windings 340U2, 340V2, and 340W2 are coupled to the second rectifier 5B.

Specifically, the second turn portions of the windings of each of the first and second groups 23A and 23B projecting from the first axial end surface of the stator core 22 constitute the first coil end portion CE1 of the stator coil 23. The first turn portions of the windings of each of the first and second groups 23A and 23B projecting from the second axial end surface of the stator core 22 constitute the second coil end portion CE2 of the stator coil 23.

Figure 8:
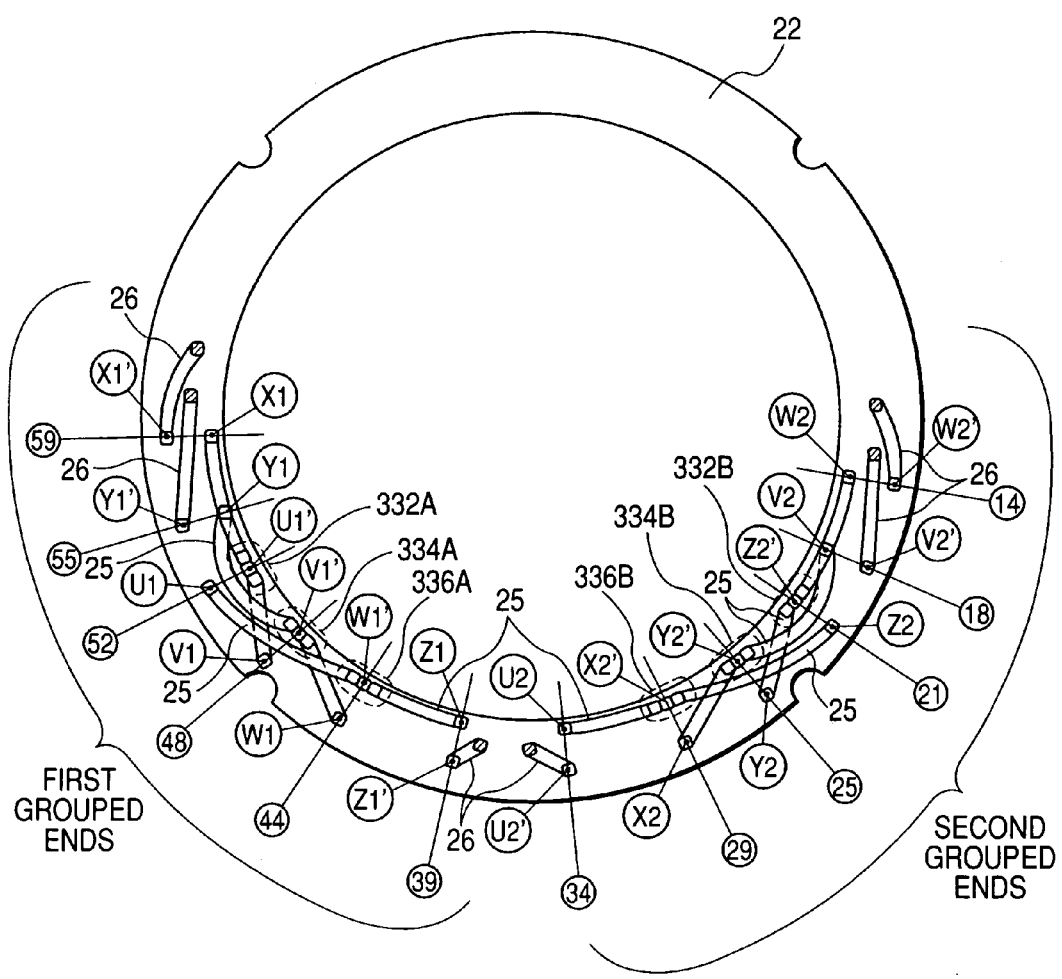
FIG. 8 is a view schematically illustrates wiring configuration of the three-phase windings of the first and second sets of the first and second groups according to the embodiment.

FIG. 8 schematically illustrates wiring configuration of the three-phase windings of the first and second sets of the first and second groups 23A and 23B. As illustrated in FIG. 8, circled reference characters U1 and U1' represent draw-out positions of the ends of the U-phase winding 330U1 from the first coil end portion side of the stator core 22. Specifically, connection leads 25 extend from the draw-out positions of the U-phase winding 330U1 so that they correspond to the ends of the U-phase winding 330U1.

Similarly, circled reference characters V1 and V1' represent draw-out positions of the ends of the V-phase winding 330V1 from the first coil end portion side of the stator core 22, and connection leads 25 extend from the draw-out positions of the V-phase winding 330V1 so that they correspond to the ends of the V-phase winding 330V1. Circled reference characters W1 and W1' represent draw-out positions of the ends of the W-phase winding 330W1 from the first coil end portion side of the stator core 22, and connection leads 25 extend from the draw-out positions of the W-phase winding 330W1 so that they correspond to the ends of the W-phase winding 330W1.

Circled reference characters X1 and X1' represent draw-out positions of the ends of the X-phase winding 340X1 from the first coil end portion side of the stator core 22. Connection and output leads 25 and 26 extend from the draw-out positions of the X-phase winding 340X1 so that they correspond to the ends of the X-phase winding 340X1. Similarly, circled reference characters Y1 and Y1' represent draw-out positions of the ends of the Y-phase winding 340Y1 from the first coil end portion side of the stator core 22. Connection and output leads 25 and 26 extend from the draw-out positions of the Y-phase winding 340Y1 so that they correspond to the ends of the Y-phase winding 340Y1. Circled reference characters Z1 and Z1' represent draw-out positions of the ends of the Z-phase winding 340Z1 from the first coil end portion side of the stator core 22. Connection and output leads 25 and 26 extend from the draw-out positions of the Z-phase winding 340Z1 so that they correspond to the ends of the Z-phase winding 340Z1.

Like the first group 23A, circled reference characters U2 and U2' represent draw-out positions of the ends of the U-phase winding 340U2 from the first coil end portion side of the stator core 22. Connection and output leads 25 and 26 extend from the draw-out positions of the U-phase winding 340U2 so that they correspond to the ends of the U-phase winding 340U2. Similarly, circled reference characters V2 and V2' represent draw-out positions of the ends of the V-phase winding 340V2 from the first coil end portion side of the stator core 22. Connection and output leads 25 and 26 extend from the draw-out positions of the V-phase winding 340V2 so that they correspond to the ends of the V-phase winding 340V2. Circled reference characters W2 and W2' represent draw-out positions of the ends of the W-phase winding 340W2 from the first coil end portion side of the stator core 22. Connection and output leads 25 and 26 extend from the draw-out positions of the W-phase winding 340W2 so that they correspond to the ends of the W-phase winding 340W2.

Circled reference characters X2 and X2' represent draw-out positions of the ends of the X-phase winding 340X2 from the first coil end portion side of the stator core 22, and connection leads 25 extend from the draw-out positions of the X-phase winding 340X2 so that they correspond to the ends of the X-phase winding 340X2. Similarly, circled reference characters Y2 and Y2' represent draw-out positions of the ends of the Y-phase winding 340Y2 from the first coil end portion side of the stator core 22, and connection leads 25 extend from the draw-out positions of the Y-phase winding 340Y2 so that they correspond to the ends of the Y-phase winding 340Y2. Circled reference characters Z2 and Z2' represent draw-out positions of the ends of the Z-phase winding 340Z2 from the first coil end portion side of the stator core 22, and connection leads 25 extend from the draw-out positions of the Z-phase winding 340Z2 so that they correspond to the ends of the Z-phase winding 340Z2.

Note that the specification will describe the draw-out positions from the first coil end portion side of the stator coil 23, which are represented by X1 and X1' and the like, as the positions of both ends of corresponding windings. In addition, circled reference numerals illustrated in FIG. 8 represent circumferential positions of both ends of each winding included in the first and second groups 23A and 23B, which are related to the slot numbers of the slots 24 illustrated in FIGS. 5 to 7.

For example, FIGS. 6 and 8 clearly show that the ends X1 and X1' of the X-phase winding 340X1 are drawn out from the first coil end portion side of the stator core 22 at the circumferential position identical with that of the slot #59. Note that the first portion of the X-phase winding 340X1 from which the end X1 extends is actually inserted in the slot #56 shifted counterclockwise from the slot #59 by three slots. In addition, the second portion of the X-phase winding 340X1 from which the end X1' extends is actually inserted in the slot #62 shifted clockwise from the slot #59 by three slots. This can be established in the ends of each of the remaining windings.

In the embodiment, as illustrated in FIG. 8, the first grouped ends U1, U1', V1, V1', W1, W1', X1, X1', Y1, Y1', Z1, and Z1' of the windings of the first and second sets 330A and 340A included in the first group 23A and the second grouped ends U2, U2', V2, V2, W2, W2', X2, X2', Y2, Y2', Z2, and Z2' of the windings of the first and second sets 330B and 340B included in the second group 23B are so arranged that the first grouped ends are separated from the second grouped ends in a circumferential direction of the stator core 22.

In other words, the first grouped ends of the windings of the first 6 and second sets 330A and 340A included in the first group 23A and the second grouped ends of the windings of the first and second sets 330B and 340B included in the second group 23B are disposed not to be overlapped onto the second grouped ends.

Moreover, when focusing on the first group 23A, the circumferential positions of the ends U1, U1', V1, V1', W1, and W1' included in the first set 330A are arranged in a circumferential direction of the stator core 22 between the ends X1, X1', Y1, and Y1' of the windings included in the second set 340A and the ends Z1 and Z1' of the windings included therein (see FIGS. 6 and 8).

In addition, the tip ends X1, U1', and V1 of the windings 340X1, 330U1, and 330V1 are respectively drawn out by the corresponding connection leads 25 to be bundled together in a group so that the bundled tip ends X1, U1', and V1 of the windings 340X1, 330U1, and 330V1 are welded to form the weld portion 332A. Similarly, the tip ends Y1, V1', and W1 of the windings 340Y1, 330V1, and 330W1 are respectively drawn out by the corresponding connection leads 25 to be bundled together in a group so that the bundled tip ends Y1, V1', and W1 of the windings 340Y1, 330V1, and 330W1 are welded to form the weld portion 334A. Moreover, the tip ends U1, W1', and Z1 of the windings 330U1, 330W1, and 340Z1 are respectively drawn out by the corresponding connection leads 25 to be bundled together in a group so that the bundled tip ends U1, W1', and Z1 of the windings 330U1, 330W1, and 340Z1 are welded to form the weld portion 336A.

The weld portions 332A, 334A, and 336A of the tip ends (X1, U1', V1), (Y1, V1', W1), and (U1, W1', Z1) are arranged in a circumferential direction of the stator core 22 to be separated from the remaining tip ends (X1', Y1'; Z1') and the corresponding leads 25 drawn out from the tip ends (X1', Y1', Z1'). In addition, the weld portions 332A, 334A, and 336A of the tip ends (X1, U1', V1), (Y1, V1', W1), and (U1, W1', Z1) are locally disposed in opposition to the inner peripheral side of the first axial end surface of the core 22 (the radially inner edge side of each of the slots 24 of the core 22).

Moreover, as illustrated in FIG. 8, the tip ends of the windings, which form each of the weld portions 332A, 334A, and 336A, are aligned, and are arranged in a circumferential direction of the stator core 22 over the radially inner edge side of the slots 24. Furthermore, the tip end of the winding disposed at the middle of the ends of the windings forming each of the weld portions extends in the axial direction of the core 22.

For example, when focusing on the weld portion 332A, as illustrated in FIG. 8, the tip ends X1, U1', and V1 of the windings 340X1, 330U1, and 330V1, which form the weld portion 332A, are aligned in a circumferential direction of the stator core 22, and are arranged over the radially inner edge side of the slots 24. Furthermore, the end U1' (connection lead 25) of the winding 330U1 disposed at the middle of the tip ends X1, U1', and V1 of the weld portion 332A extends in the axial direction of the core 22 without extending any circumferential directions. The arrangement features of the weld portion 332A can be established in the remaining weld portions 334A and 336A.

In addition, the weld portions 332A, 334A, and 336A are aligned in the circumferential direction of the core 22. Moreover, one end (connection lead) of the winding drawn out from one of the slots 24 for one of the weld portions 332A, 334A, and 336A is arranged to intersect with one end of the winding drawn out from another one of the slots 24 for another one of the weld portions 332A, 334A, and 336A such that the one end of the winding drawn out from the one of the slots 24 jumps over the one end of the winding drawn out from another one of the slots 24; this one of the weld portions 332A, 334A, and 336A is disposed forwardly in a predetermined circumferential direction from another one of the weld portions 332A, 334A, and 336A.

For example, assuming that, in FIG. 8, the predetermined circumferential direction is the counterclockwise direction, the end Y1 (lead 25) of the winding 340Y1 drawn out from the corresponding one of the slots 24 for the weld portion 334A disposed forwardly in the counterclockwise direction from the weld portion 332A is disposed to intersect with the end V1 (lead 25) of the winding 330V1 drawn out from another one of the slots 24 for the weld portion 332A such that the end Y1 of the winding 340Y1 jumps over the end V1 of the winding 330V1.

Similarly, when focusing on the second group 23B, the circumferential positions of the ends X2, X2', Y2, Y2', Z2, and Z2' included in the first set 330B are arranged circumferentially between the ends W2, W2', V2, and V2' of the windings included in the second set 3403 and the ends U2 and U2' of the windings included therein (see FIGS. 5 and 7).

In addition, the tip ends W2, Z2', and Y2 of the windings 340W2, 330Z2, and 330Y2 are respectively drawn out by the corresponding connection leads 25 to be bundled together in a group so that the bundled tip ends W2, Z2, and Y2 of the windings 340W2, 330Z2, and 330Y2 are welded to form the weld portion 3321. Similarly, the tip ends V2, Y2', and X2 of the windings 340V2, 330Y2, and 330X2 are respectively drawn out by the corresponding connection leads 25 to be bundled together in a group so that the bundled ends V2, Y2', and X2 of the windings 340V2, 330Y2, and 330X2 are welded to form the weld portion 334B. Moreover, the tip ends Z2, X2', and U2 of the windings 330Z2, 330X2, and 340U2 are respectively drawn out by the corresponding connection leads 25 to be bundled together in a group so that the bundled tip ends Z2, X2, and U2 of the windings 330Z2, 330X2, and 340U2 are welded to form the weld portion 336B.

The weld portions 33213, 3343, and 33613 of the tip ends (W2, Z2', Y2), (V2, Y2', X2), and (Z2, X2', U2) are circumferentially arranged to be separated from the remaining tip ends (W2', V2, U2) and the corresponding connection leads 25 drawn out from the ends (W2', V2', U2'). In addition, the weld portions 332B, 334B, and 336B of the tip ends (W2, Z2, Y2), (V2, Y2', X2), and (Z2, X2', U2) are locally disposed to the inner peripheral side of the core 22 (the radially inner edge side of each of the slots 24 of the core 22).

Moreover, as illustrated in FIG. 8, the tip ends of the windings, which form each of the weld portions 332B, 334B, and 336B, are circumferentially aligned, and are arranged over the radially inner edge side of the slots 24. Furthermore, the tip end of the winding disposed at the middle of the tip ends of the windings forming each of the weld portions in the anal direction of the core 22.

For example, when focusing on the weld portion 332B, as illustrated in FIG. 8, the tip ends W2, Z2, and Y2 of the windings 340W2, 330Z2, and 330Y2, which form the weld portion 332B, are circumferentially aligned, and are arranged over the radially inner edge side of the slots 24. Furthermore, the end Z2' (connection lead 25) of the winding 330Z2 disposed at the middle of the ends W2, Z2', and Y2 of the weld portion 332B extends in the axial direction of the core 22 without extending any circumferential directions. The arrangement features of the weld portion 332B can be established in the remaining weld portions 334B and 336B.

In addition, the weld portions 332B, 334B, and 336B are aligned in the circumferential direction of the core 22. Moreover, one end (connection lead) of the winding drawn out from one of the slots 24 for one of the weld portions 332B, 334B, and 336B is disposed to intersect with one end of the winding drawn out from another one of the slots 24 for another one of the weld portions 332B, 334B, and 336B such that the one end of the winding drawn out from the one of the slots 24 jumps over the one end of the winding drawn out from another one of the slots 24; this one of the weld portions 332B, 334B, and 336B is disposed forwardly in a predetermined circumferential direction from another one of the weld portions 332B, 334B, and 336B.

For example, assuming that, in FIG. 8, the predetermined circumferential direction is the clockwise direction, the end V2 (connection lead 25) of the winding 340V2 drawn out from the corresponding one of the slots 24 for the weld portion 334B disposed forwardly in the clockwise direction from the weld portion 332B is arranged to intersect with the end Y2 (connection lead 25) of the winding 330Y2 drawn out from the corresponding slot for the weld portion 332B such that the end V2 of the winding 340V2 jumps over the end Y2 of the winding 330Y2.

As described above, the stator coil 23 of the alternator 1 according to the embodiment includes the first and second groups 23A and 23B each having the complicated structure in which the delta-connected three-phase windings and star-connected windings are combined to each other.

Particularly, in the stator coil 23 of the alternator 1 according to the embodiment, the first grouped ends of the three-phase windings of the first and second sets 330A and 340A included in the first group 23A and the second grouped ends of the three-phase windings of the first and second sets 330B and 340B of the windings included in the second group 23B are so arranged that the first grouped ends are circumferentially separated from the second grouped ends.

This configuration allows the lengths of the connection leads 25 included in each of the first and second groups 23A and 233B to decrease, making it possible to simplify connections of the respective ends of the three-phase windings included in each of the first and second groups 23A and 23B.

In addition, as illustrated in FIGS. 5, 6, and 8, the circumferential positions of the ends of the delta-connected three-phase windings of the first set (330A, 3303) are arranged to be circumferentially included in the circumferential positions of the ends of the remaining windings of the second set (340A, 340B). This allows the connection leads 25 connecting between the output ends of the delta-connected three-phase windings of the first set (330A, 330B) and the three-phase windings of the second set (340A, 340B) to locally concentrate in the circumferential direction of the core 22. This makes it possible to further simplify connections between the output ends of the delta-connected three-phase windings of the first set (330A, 330B) and the three-phase windings of the second set (340A, 340B). With simplicity of connections between the output ends of the delta-connected three-phase windings of the first set (330A, 330B) and the three-phase windings of the second set (340A, 340B), phase-to-phase insulation of the three-phase windings included in each of the first and second groups 23A and 23B can be easily ensured. This permits the stator core 23 and stator 2 to be easily manufactured and downsized.

The output leads 26 of each of the first and second groups 23A and 23B are locally arranged in the circumferential direction of the core 22. Accordingly, even if arrangements of the output leads 26 from the first and second groups 23A and 23B are limited to a space in the circumferential direction of the core 22 so as to meet the configuration of the rectifier assembly 5 that is determined not to interfere the brushes and/or the voltage regulator, it is possible to easily adjust the arrangements of the output leads 26 to the limited space. This can prevent complicated wiring configuration.

Moreover, the weld portions between the ends of the three-phase windings of the first set (330A, 340A) and those of the three-phase windings of the second set (3303, 3403) of each of the first and second groups 23A and 23B are circumferentially arranged to be separated from the leads 25 drawn out from the output ends of the three-phase windings of the second set (340A, 340B) of each of the first and second groups 23A and 23B. This permits interference between welding jigs for welding of the weld portions and the leads 25 drawn out from the output ends of the three-phase windings to be reduced, making it easy to manufacture the stator coil 23 and stator 2.

In the embodiment, the weld portions between the ends of the three-phase windings of the first set (330A, 340A) and those of the three-phase windings of the second set (330B,

340B) of each of the first and second groups 23A and 23B are locally disposed in opposition to the inner peripheral side of the first axial end surface of the core 22. This allows sufficient spaces between the rear frame 4B accommodating therein the stator 2 and each weld portion to be easily secured. Thus, it is unnecessary to increase the size of the rear frame 4B in order to avoid interference between each weld portion and the inner peripheral surface of the rear frame 4B. This makes it possible to further downsize the stator coil 23 and stator 2.

Moreover, the ends of the windings, which form each of the weld portions 332A, 334A, and 336A, are circumferentially aligned, and are drawn out from the radially inner edge side of the corresponding slots 24. This makes it possible to easily bundle the ends of the windings for each of the weld portions and weld them.

Furthermore, the end of the winding disposed at the middle of the ends of the windings forming each of the weld portions extends in the axial direction of the core 22. That is, the end of the winding disposed at the middle of the ends of the windings forming each of the weld portions extends in the axial direction of the core 22 without extending any circumferential directions. This allows oscillations occurring during rotatable drive of the alternator 1 (rotor 2) to decrease.

In each of the first and second groups 23A and 23B, the weld portions are aligned in the circumferential direction of the core 22, and one end (lead) of the winding drawn out from the corresponding slot for one of the weld portions disposed forwardly in a predetermined circumferential direction is arranged to intersect with another one end of the winding drawn out from the corresponding slot for another one of the weld portions disposed backwardly in the predetermined circumferential direction from the one of the weld portions such that the one end of the winding jumps over another one end of the winding. This allows arrangement of the weld portions of each of the first and second groups 23A and 23B to have the above described regularity. Thus, the regular arrangement of the weld portions of each of the first and second groups 23A and 23B makes it possible to easily draw out the ends of the windings for each of the weld portions of each of the first and second groups 23A and 23B from the corresponding slots 24 and easily bundle them.

In the embodiment, as a modification of the embodiment, each of the three-phase windings included in the first and second groups 23A and 23B is made up of sequentially joined conductor units each with a substantially U or V shaped turn portion as illustrated in FIGS. 9 to 12. Specifically, the sequent joined conductor units provide a series-connected winding in each phase corresponding to each of the three-phase windings.

In each of the first and second groups 23A and 23B, an even number, such as four in the modification, of conductor members arm inserted in each slot 24. Four conductor members being disposed in one of the slots 24 are aligned in the radial direction and respectively disposed in an innermost layer, an inner middle layer, an outer middle layer, and an outermost layer from the inner periphery of each slot 24 (see FIGS. 10 and 11).

A conductor member 231a disposed in the innermost layer of one of the slots 24 is paired with a conductor member 231b disposed in the outermost layer of another slot 24 that is spaced apart from the one of the slots 24 by one pole pitch (six slot pitches) in clockwise direction. Similarly, a conductor member 232a disposed in the inner middle layer of one of the slots 24 is paired with a conductor member 232b disposed in the outer middle layer of another slot 24 that is spaced apart from the one of the slots 24 by one pole pitch in clockwise direction. The paired conductor members 231a and 231b are connected to each other by a continuous U or V shaped turn portion 231c at the first axial end surface side of the core 22. The paired conductor members 232a and 232b are also connected to each other by a continuous U or V shaped turn portion 232c at the first axial end surface side of the core 22.

Figure 9:
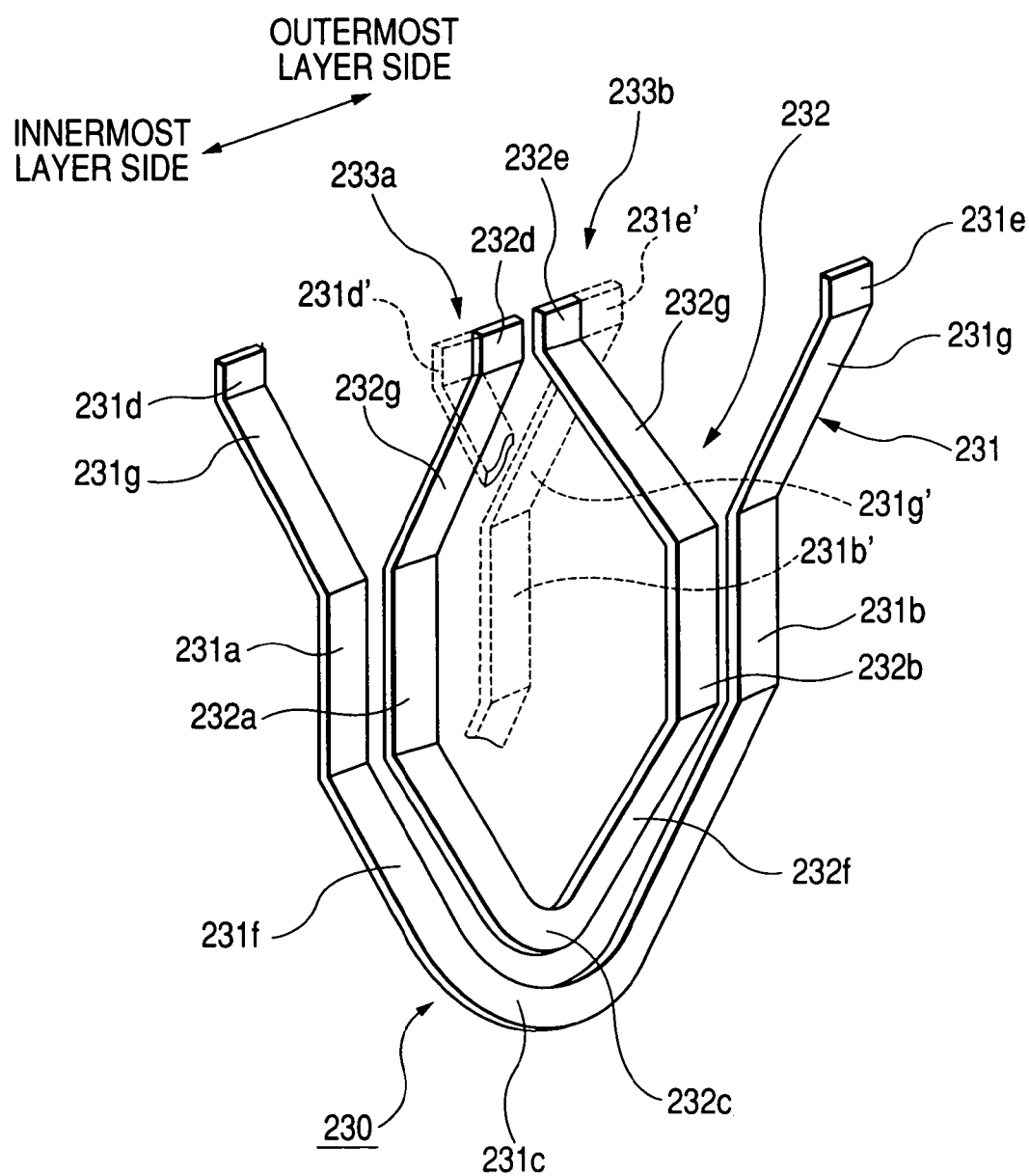
FIG. 9 is a perspective view of conductor segments forming a stator coil according to a modification of the embodiment.
Figure 10:
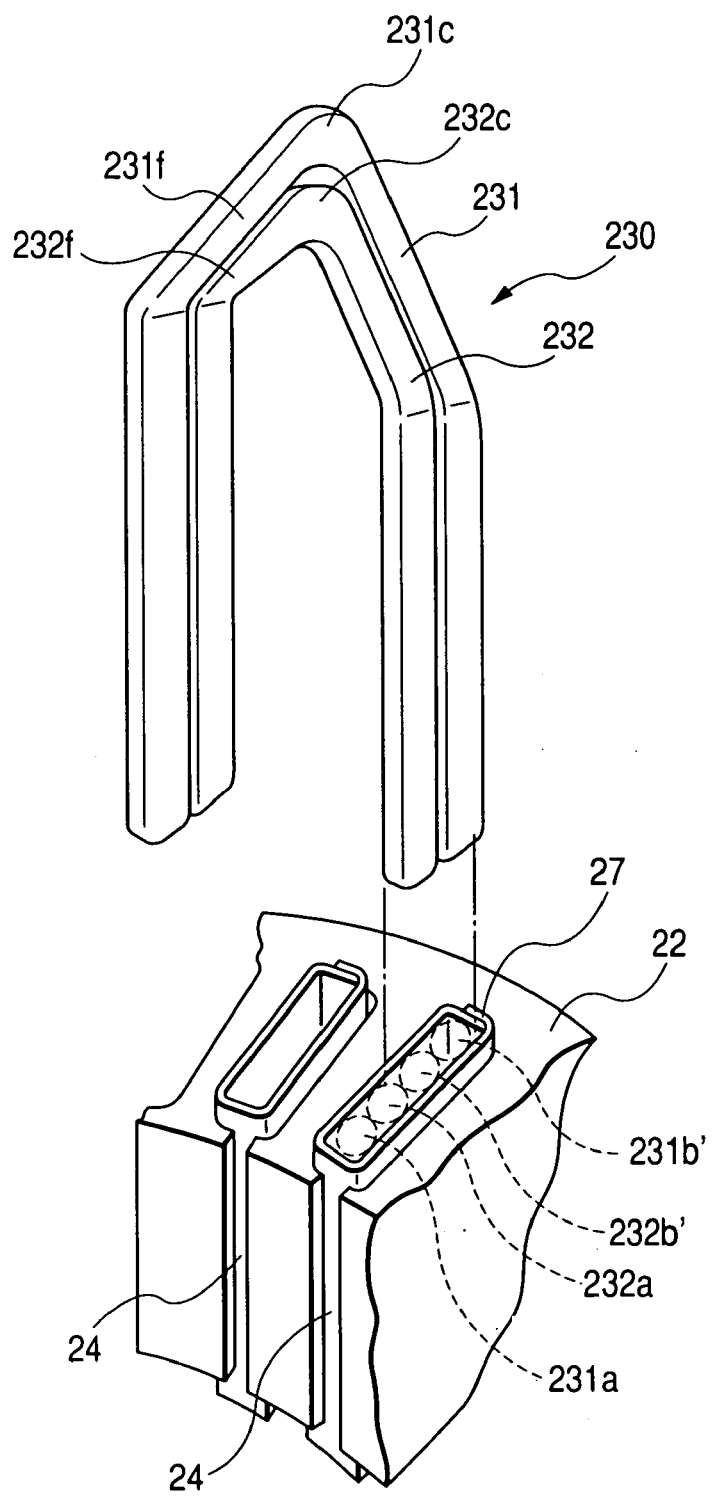
FIG. 10 is a perspective view of the conductor segments shown in FIG. 9 being inserted in corresponding slots of a stator core of a stator according to the modification.

Accordingly, as illustrated in FIGS. 9 and 10, at the first axial end surface side of the stator core 22, a continuous conductor portion consisting of the conductor member 232a disposed in the inner middle layer, the conductor member 232b disposed in the outer middle layer, and the turn portion 232c connecting therebetween is enclosed by a continuous conductor portion consisting of the conductor member 231a disposed in the innermost layer, the conductor member 231b disposed in the outermost layer, and the turn portion 231c connecting therebetween.

Specifically, at the fist axial end surface side of the stator core 22, the turn portion 232c as a connection portion between the paired conductor members is surrounded by the turn portion 231c as a connection portion between the paired conductor members. Connection between the conductor member 232b inserted in the outer middle layer and the conductor member 232a inserted in the inner middle layer provides a middle layer coil end. Connection between the conductor member 231b inserted in the outermost layer and the conductor member 231a inserted in the innermost layer provides an outer layer coil end disposed at the outer side of the middle layer coil end.

The conductor member 232a arranged in the inner middle layer of one of the slots 24 is also paired with a conductor member 231a' arranged in the innermost layer of another slot 24 that is one pole pitch clockwise spaced apart from the one of the slots 24. Similarly, the conductor member 231b' arranged in the outermost layer of one of the slots 24 is also paired with a conductor member 232b arranged in the outer middle layer of another slot 24 that is one pole pitch clockwise spaced apart from the one of the slots 24. Junctions between the paired conductor members are disposed at the second axial end surface side of the stator core 22.

Figure 11:
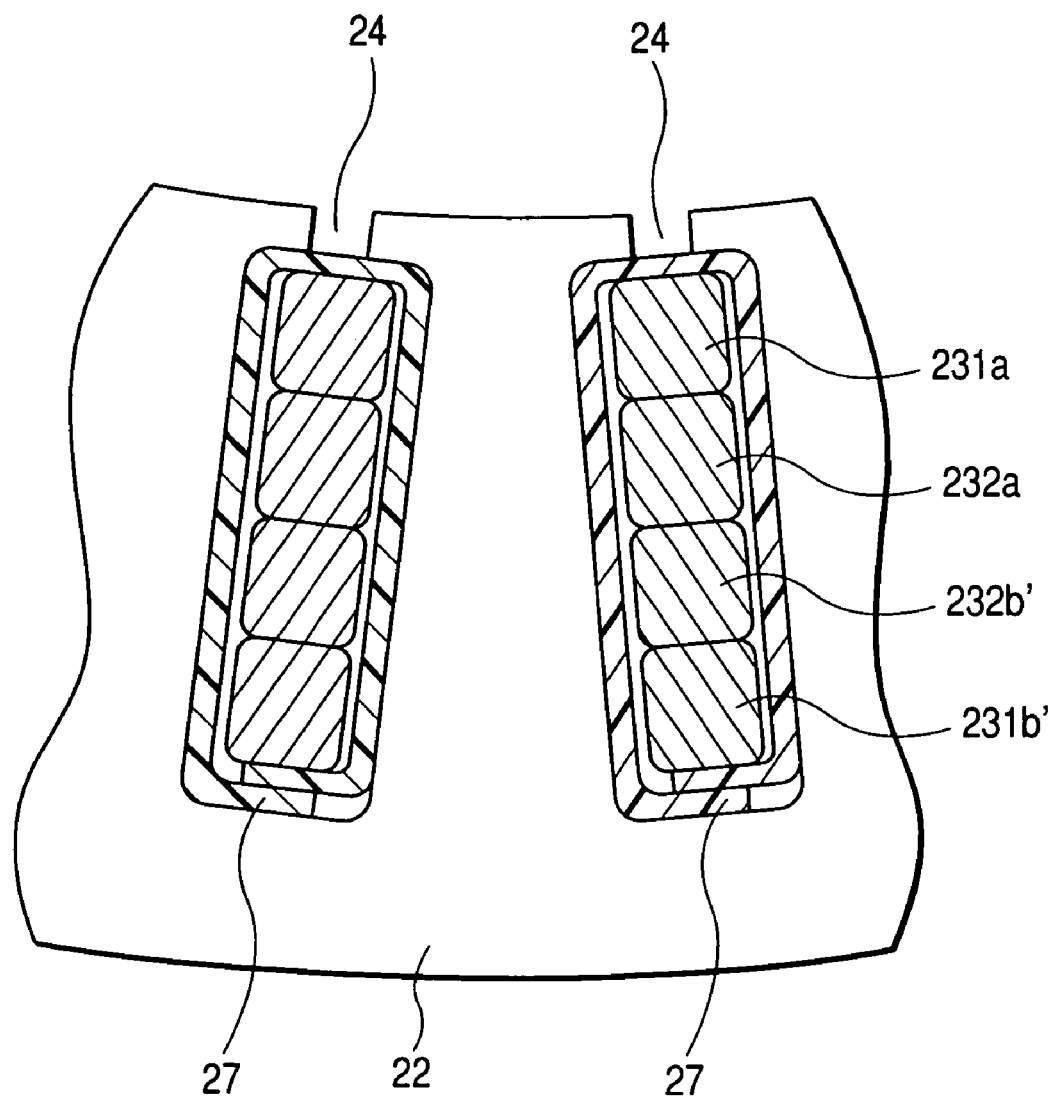
FIG. 11 is a partially cross sectional enlarged view schematically illustrating part of the stator according to the modification.
Figure 12:
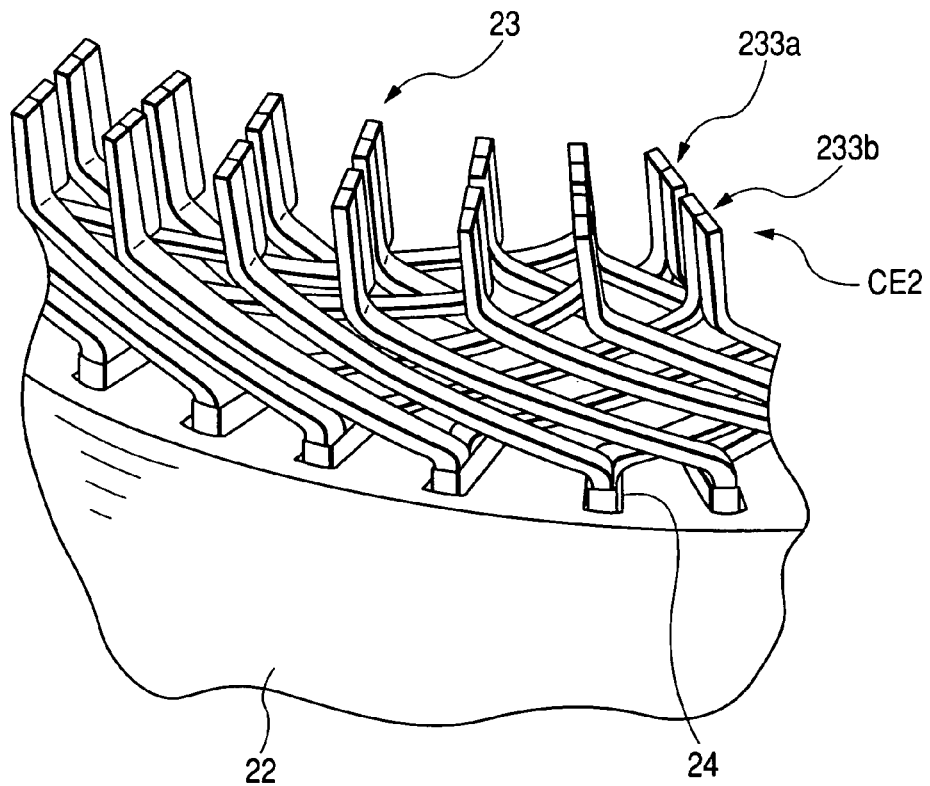
FIG. 12 is a perspective view schematically illustrating a second coil end portion of the stator coil according to the modification.
Figure 13:
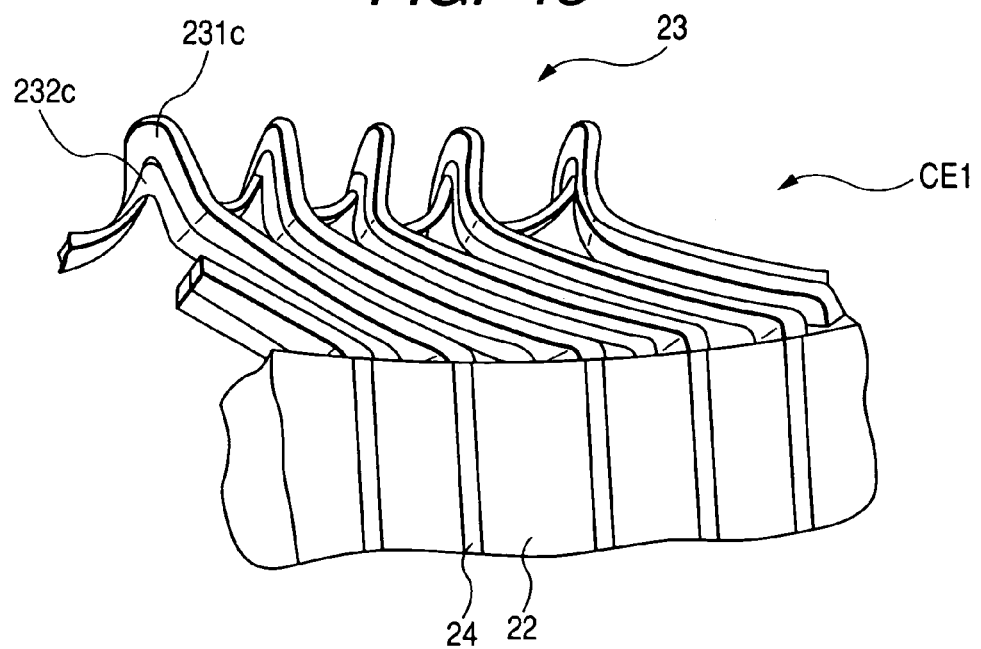
FIG. 13 is a perspective view schematically illustrating a first coil end portion of the stator coil according to the modification.

As illustrated in FIGS. 9 to 11, each reference number with no dash and that with a dash (') are assigned to the identical portions of different conductor members 231. Similarly, each reference number with no dash and that with a dash (') are assigned to the identical portions of different conductor members 232.

Thus, at the second axial end surface side of the core 22, as illustrated in FIG. 9, an outside connection portion 233b connecting the conductor member 231b' disposed in the outermost layer and the conductor member 232b disposed in the outer middle layer and an inner side connection portion 233a connecting the conductor member 231a' disposed in the innermost layer and the conductor member 232a disposed in the inner middle layer are arranged to be shifted from each other in the radial and circumferential directions. Connection of the outermost conductor member 231b' and the outer middle conductor member 232b, and that of the innermost conductor member 231a' and the inner middle conductor member 232a provide two adjacent coil-end layers. The two adjacent coil-end layers are arranged on different concentric circles, respectively.

As illustrated in FIG. 9, the conductor member 231a inserted in the innermost layer, the conductor member 231b inserted in the outermost layer, and the turn portion 231c provide a U or V shaped large conductor segment 231. Similarly, the conductor member 232a inserted in the inner middle layer, the conductor member 232b inserted in the outer middle layer, and the turn portion 232c provide a U or V shaped small conductor segment 232. A basic conductor segment unit 230 consists of a pair of the large conductor segment 231 and the small conductor segment 232.

The large conductor segment 231 is composed of a pair of straight conductor portions corresponding to the conductor members 231a and 231b, and the U- or V-shaped turn portion 231c. The paired straight conductor portions 231a and 231b extending at their one ends from ends of the turn portion 231c are to be inserted into the slots 24.

The larger conductor segment 231 is also composed of projecting end portions (legs) 231g continuing from the other ends of the straight conductor portions 231a and 231b and projecting outside the corresponding slots 24 when the straight conductor portions 231a and 231b are placed within the slots 24. The projecting end portions 231g are bent with a predetermined electric angle with respect to the axial direction of the corresponding slots 24.

The turn portion 231c of the large conductor segment 231 is composed of a tip portion and a pair of slant portions 231f. The paired slant portions 231f are designed to continue from both ends of the tip portion, slant with a predetermined electric angle with respect to the anal direction of the corresponding slots 24, and lead to the straight conductor portions 231a and 231b, respectively.

Similarly, the small conductor segment 232 is composed of a pair of straight conductor portions corresponding to the conductor members 232a and 232b, and the U- or V-shaped turn portion 232c. The paired straight conductor portions 232a and 232b extending at their one ends from ends of the turn portion 232c are to be inserted into the slots 24.

The small conductor segment 232 is also composed of projecting end portions (legs) 232g continuing from the other ends of the straight conductor portions 232a and 232b and projecting outside the corresponding slots 24 when the straight conductor portions 232a and 232b are placed within the slots 24. The projecting end portions 232g are bent with a predetermined electric angle with respect to the axial direction of the corresponding slots 24.

The turn portion 232c of the small conductor segment 232 is composed of a tip portion and a pair of slant portions 232f. The paired slant portions 232f are designed to continue from both ends of the tip portion, slant with a predetermined electric angle with respect to the axial direction of the corresponding slots 24, and lead to the straight conductor portions 232a and 232b, respectively. The turn portions 231c and 232c projecting from the corresponding slots 24 through the first axial end surface side of the core 22 provide the first coil end portion CE1 (see FIG. 13).

The above-described configuration is applied to the conductor segment units 230 disposed in all the slots 24. A tip end 231e' of the slant portion 231g' extending from the straight conductor portion 231b' inserted in the outermost layer and a tip end 232e of the slant portion 232g extending from the straight conductor portion 232b inserted in the outer middle layer are welded together to form an outside joint portion 233b. Similarly, a tip end 232d of the slant portion 232g extending from the straight conductor portion 232a inserted in the inner middle layer and a tip end 231d' of the slant portion 231g' extending from the straight conductor portion 231a' inserted in the innermost layer are welded together to form an inside joint portion 233a. The inside and outside joint portions 233a and 233b and the corresponding projecting end portions projecting from the corresponding slots 24 through the second axial end surface side of the core 22 provide the second coil end portion CE2 (see FIG. 12).

In the modification of the embodiment, the above described conductor segment units 230 provide the stator core 23 with the same winding structure as illustrated in FIGS. 5 to 7.

Figure 14:
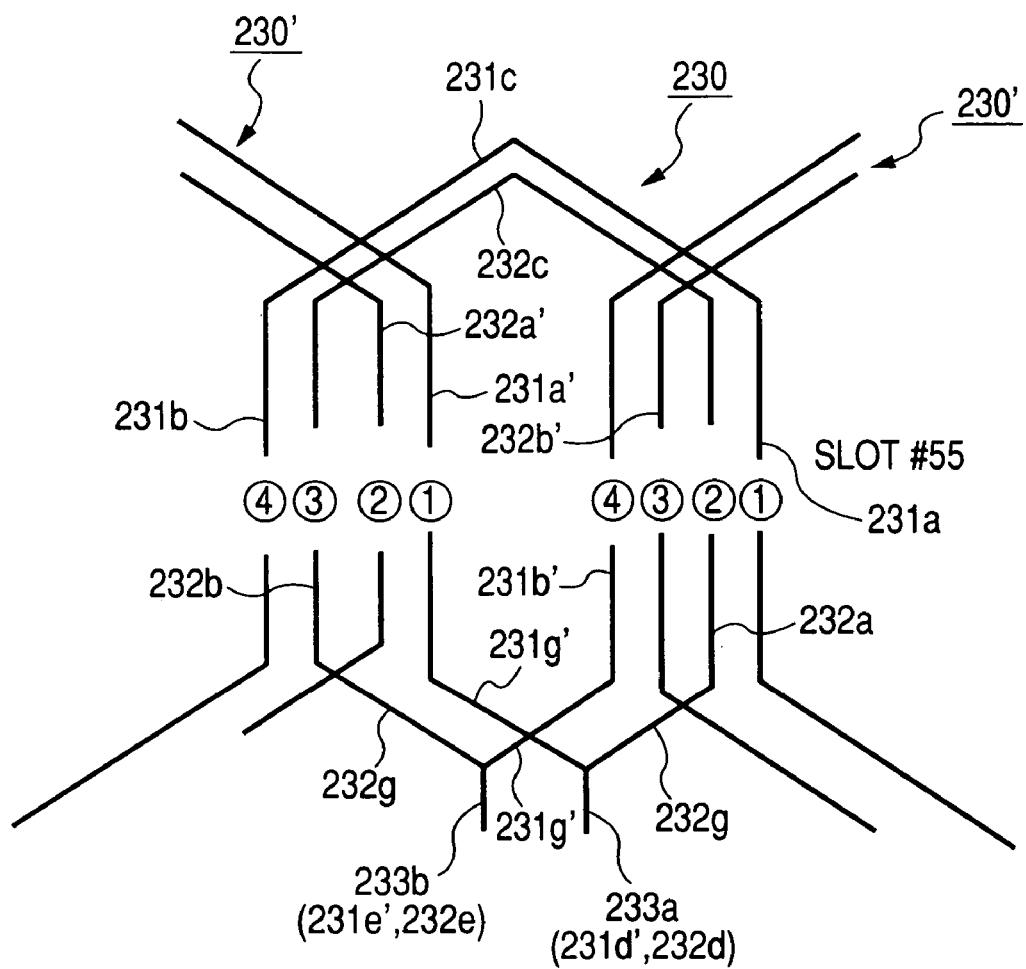
FIG. 14 is an enlarged winding diagram development of part of the stator coil according to the modification of the embodiment, which corresponds to part of the winding diagram development of FIG. 6.

Specifically, when focusing on the first group 23A of three-phase windings, six-phase windings that are shifted from one another by an electric angle of π/6 radian in phase are disposed in every six of the slots 24 of the stator core 22 corresponding to one pole-pitch. For example, part of the U-phase winding 330U1 that is composed of the conductor segment units 230 being disposed in the slots #55 and #61 is illustrated in FIG. 14 corresponding to part of FIG. 6. In FIG. 14, circled numerals ①, ②, ③, and ④ correspond to the first layer (innermost layer), the second layer (inner middle layer), the third layer (outer middle layer), and the fourth layer (outermost layer) in each of the slots #55 and #61.

As clearly illustrated in FIG. 14, part of the U-phase winding 330U1 being disposed in the slots #55 and #61 consists of:

the straight conductor portion 231b' corresponding to the first portion and inserted in the slot #55 at the fourth layer thereof, the straight conductor portion 232b corresponding to the second portion and inserted in the slot #61 at the third layer thereof, a set of the slant portions 231g', 232g, and the inside joint portion 233b (tip ends 231e', 232e), which corresponds to the first turn portion and continuously connecting between one end of the straight conductor portion 231b' projecting from the slot #55 at the second coil end portion side of the core 22 and that of the straight conductor portion 232b projecting from the slot #61 thereat, the straight conductor portion 232a corresponding to the third portion and inserted in the slot #55 at the second layer thereof, the turn portion 232c corresponding to the second turn portion and continuously connecting between the other end of the straight conductor portion 232b projecting from the slot #61 at the first coil end side of the core 22 and one end of the straight conductor portion 232a third portion projecting from the slot #55 thereat, the straight conductor portion 231a' corresponding to the fourth portion and inserted in the slot #61 at the first layer thereof, and a set of the slant portions 232g, 231g', and the inside joint portion 233a (tip ends 282d, 231d), which corresponds to the third turn portion continuously connecting between the other end of the straight conductor portion 232a projecting from the slot #55 at the second coil end portion side of the core 22 and one end of the straight conductor portion 231a' projecting from the slot #61 thereat.

Specifically, in the modification, U-phase winding 330U1 disposed in one of the slots 24, V-phase winding 330V1 and W-phase winding 330W1 respectively disposed in other slots 24 that are spaced apart from the one of the slots 24 by 4 or 8 slot pitches are connected to form a first set 330A of delta-connected three-phase windings. X-phase winding 340X1, Y-phase winding 340Y1, and Z-phase winding 340Z1, which are respectively inserted in slots respectively spaced apart from the slots for the U-, V-, and W-phase windings are disposed, are respectively connected in series to the three junctions of the delta-connected three-phase winding of the first set 330A to provide three-phase windings of a second set 340A.

Similarly, when focusing on the second group 23B of three-phase windings, six-phase windings that are shifted from one another by an electric angle of π/6 radian in phase are disposed in every six of the slots 24 of the stator core 22 corresponding to one pole-pitch.

X-phase winding 330X2 disposed in one of the slots 24, Y-phase winding 330Y2 and Z-phase winding 330Z2 respectively disposed in other slots 24 that are spaced apart from the one of the slots 24 by 4 or 8 slot pitches are connected to form a first set 330B of delta-connected three-phase windings. U-phase winding 340U2, V-phase winding 340V2, and W-phase winding 340W2, which are respectively inserted in slots respectively spaced apart from the slots for the U-, V-, and W-phase windings are disposed, are respectively connected in series to the three junctions of the delta-connected three-phase winding of the first set 330B to provide three-phase windings of a second set 340B.

Because both ends (connection and output leads) of the three-phase windings included in each of the first and second groups 23A and 23B are drawn out from the turn portions of the conductor segment units 230, the conductor segment units 230 include some special conductor segment units to provide the connection and output leads. Specifically, as can be seen from the enlarged winding diagram developments of FIGS. 5 and 6, the tip portion of the turn portion 231c of some of the conductor segment units 230 is cut, and the cut ends of the tip portion are designed to axially extend as the output leads and parts of the connection leads, thereby forming some of the special conductor segment units.

As described above, in the modification, the first and second groups 23A and 23B of thee-phase windings can be formed by the use of the substantially U shaped conductor segment units 230. This allows the connection and output leads to be arranged at the first coil end CE1 formed by the turn portions 231c of the large conductor segments 231. Accordingly, in addition to the effects obtained by the embodiment, it is possible to weld the ends of the three phase windings and to route the connection and output leads at the turn portion side of the stator coil 23, thereby more easily manufacturing the stator coil 23 and the stator 2.

In the embodiment and its modification, the first set (330A, 330B) of three-phase windings of each of the first and second groups 23A and 23B is disposed to be shifted in phase from the second set (340A, 340B) of three-phase windings of each of the first and second groups 23A and 23B by an electric angle of π/6 in phase. This arrangement allows magnetic noise to decrease. In the present invention, the first set (330A, 330B) of three-phase windings of each of the first and second groups 23A and 23B can be disposed to be shifted in phase from the second set (340A, 340B) of three-phase windings of each of the first and second groups 23A and 23B by another electric angle.

Similarly, the second group 23B of first and second sets of three-phase windings is disposed to be shifted in phase from the first group 23A of first and second sets of three-phase windings by an electric angle of π/6 radian. This arrangement permits magnetic noise to further decrease. In the present invention, the second group 23B of first and second sets of three-phase windings can be disposed to be shifted in phase from the first group 23A of first and second sets of three-phase windings by another electric angle.

In the embodiment and its modification, it is possible to freely set the number of turns of respective three-phase windings included in each of the first and second groups 23A and 23B.

In the embodiment and its modification, the present invention is applied to an alternator for vehicles, but the present invention is not limited to the application. Specifically, the present invention can be applied to other types of rotary electric machines, such as motors for vehicles or the like.

While there has been described what is at present considered to be the embodiment and its modification of the present invention, it will be understood that various modifications which are not described yet may be made therein, and it is intended to cover in the appended claims all such modifications as fall within the true spirit and scope of the invention.

What is claimed is:

1. A rotary electric machine comprising:
    a stator core having axially opposing end surfaces and a plurality of substantially circumferentially spaced slots; and
    a stator coil, the stator coil comprising:
        a first group of first and second sets of three-phase windings disposed in part of the slots, the first set including first three-phase windings each with output ends, the output ends of the first three-phase windings being connected in series to each other to form delta configuration with junctions between the first three-phase windings, the second set including second three-phase windings having output and input ends, the input ends being respectively connected in series to the junctions of the first three-phase windings, and
        a second group of third and fourth sets of three-phase windings disposed in another part of the slots, the third set including third three-phase windings each with output ends, the output ends of the third three-phase windings being connected in series to each other to form delta configuration with junctions between the third three-phase windings, the fourth set including fourth three-phase windings having output and input ends, the input ends being respectively connected in series to the junctions of the third three-phase windings, the output ends of the first to fourth three-phase windings and the input ends of the second and fourth windings being disposed at one of the opposing end surface sides of the stator core, the output ends of the first and second three-phase windings of the first and second sets included in the first group being separated, in a circumferential direction of the stator core, from the output ends of the third and fourth three-phase windings of the third and fourth sets included in the second group, respectively, so that the output ends of the first and second three-phase windings of the first and second sets included in the first group are nonoverlapped, in the circumferential direction of the stator core, with the output ends of the third and fourth three-phase windings of the third and fourth sets included in the second group.

2. A rotary electric machine according to claim 1, wherein the first group includes first weld portions formed by welding respectively the junctions of the first three-phase windings and the input ends of the second three-phase windings together, and the second group includes second weld portions formed by welding respectively the junctions of the third three-phase windings and the input ends of the fourth three-phase windings together, the first weld portions being arranged to be separated from the output ends of the second three-phase windings, the second weld portions being arranged to be separated from the output ends of the fourth three-phase windings.

3. A rotary electric machine according to claim 2, wherein the first and second weld portions are locally disposed in opposition to an inner peripheral side of one of the opposing end surfaces of the stator core.

4. A rotary electric machine according to claim 2, wherein each of the first weld portions is composed of:
    one of the output ends of one of the first three-phase windings,
    one of the output ends of another one of the first three-phase windings, and
    the input end of one of the second three-phase windings, the output and input ends constituting each of the first weld portions being aligned substantially circumferentially to be arranged in opposition to an inner peripheral side of one of the opposing end surfaces of the stator core, and wherein each of the second weld portions is composed of:
    one of the output ends of one of the third three-phase windings,
    one of the output ends of another one of the third three-phase windings, and
    the input end of one of the fourth three-phase windings, the output and input ends constituting each of the second weld portions being aligned circumferentially to be arranged in opposition to the inner peripheral side of one of the opposing end surfaces of the stator core.

5. A rotary electric machine according to claim 4, wherein any one of the circumferentially aligned ends of each of the first weld portions is disposed at the middle of the output and input ends of any one of the circumferentially aligned ends, and the middle-disposed end extends substantially in the axial direction of the stator core, and any one of the circumferential aligned ends of each of the second weld portions is disposed at the middle thereof, and the middle-disposed end extends substantially in the axial direction of the stator core.

6. A rotary electric machine according to claim 2, wherein the first weld portions are substantially circumferentially aligned, each of the first weld portions is composed of:
    one of the output ends of one of the first three-phase windings,
    one of the output ends of another one of the first three-phase windings, and
    the input end of one of the second three-phase windings, one of the ends constituting one of the first weld portions is drawn out from one of the slots and is arranged to intersect with one of the ends of one of the first three-phase windings disposed in another one of the slots constituting another one of the first weld portions such that the one end of the winding drawn out from the one of the slots jumps over that of the winding drawn out from another one of the slots, the one of the first weld portions being disposed forwardly in a predetermined circumferential direction from another one of the first weld portions, and wherein the second weld portions are substantially circumferentially aligned, each of the second weld portions is composed of:
    one of the output ends of one of the third three-phase windings,
    one of the output ends of another one of the third three-phase windings, and
    the input end of one of the fourth three-phase windings, one of the ends constituting one of the third weld portions is drawn out from one of the slots and is arranged to intersect with one of the ends of one of the third three-phase windings disposed in another one of the slots constituting another one of the third weld portions such that the one end of the winding drawn out from the one of the slots jumps over that of the winding drawn out from another one of the slots, the one of the third weld portions being disposed forwardly in a predetermined circumferential direction from another one of the third weld portions, wherein any one of the ends of each of the circumferentially aligned first weld portions is disposed at the middle of the output and input ends, and the middle-disposed end extends substantially in the axial direction of the stator core, and any one of the ends of each of the circumferentially aligned second weld portions is disposed at the middle thereof, and the middle-disposed end extends substantially in the axial direction of the stator core.

7. A rotary electric machine according to claim 1, wherein each of the first and second three-phase windings comprises a plurality of conductor segment units each having a substantially U shape turn portion and substantially straight portions extending therefrom and having tip end portions, one of the tip end portions of one of the conductor segment units being sequentially joined to one of the tip end portions of another one of the conductor segment units to form a series-connected winding in each phase corresponding to each of the first and second three-phase windings, and each of the third and fourth three-phase windings comprises a plurality of conductor segment units each having a substantially U shape turn portion and substantially straight portions extending therefrom and having tip end portions, one of the tip end portions of one of the conductor segment units being sequentially joined to one of the tip end portions of another one of the conductor segment units to form a series-connected winding in each phase corresponding to each of the third and fourth three-phase windings.

8. A rotary electric machine according to claim 1, wherein the turn portions of the first, second, third, and fourth three-phase windings provide a coil end of the stator coil, the output ends of the first three-phase windings and the output and input ends of the second three-phase windings are arranged at the coil end of the stator coil, and the output ends of the third three-phase windings and the output and input ends of the fourth three-phase windings are arranged at the coil end of the stator coil.

9. A stator coil to be provided in a stator core, the stator core having axially opposing end surfaces and a plurality of substantially circumferentially spaced slots, the stator coil comprising:
a first group of first and second sets of three-phase windings disposed in part of the slots, the first set including first three-phase windings each with output ends, the output ends of the first three-phase windings being connected in series to each other to form delta configuration with junctions between the first three-phase windings, the second set including second three-phase windings having output and input ends, the input ends being respectively connected in series to the junctions of the first three-phase windings, and
a second group of third and fourth sets of three-phase windings disposed in another part of the slots, the third set including third three-phase windings each with output ends, the output ends of the third three-phase windings being connected in series to each other to form delta configuration with junctions between the third three-phase windings, the fourth set including fourth three-phase windings having output and input ends, the input ends being respectively connected in series to the junctions of the third three-phase windings, the output ends of the first to fourth three-phase windings and the input ends of the second and fourth windings being disposed at one of the opposing end surface sides of the stator core, the output ends of the first and second three-phase windings of the first and second sets included in the first group being separated, in a circumferential direction of the stator core, from the output ends of the third and fourth three-phase windings of the third and fourth sets included in the second group, respectively, so that the output ends of the first and second three-phase windings of the first and second sets included in the first group are nonoverlapped, in the circumferential direction of the stator core, with the output ends of the third and fourth three-phase windings of the third and fourth sets included in the second group.

* * * * *

UNITED STATES PATENT AND TRADEMARK OFFICE
CERTIFICATE OF CORRECTION

PATENT NO. : 7,705,506 B2  Page 1 of 1
APPLICATION NO. : 11/392550
DATED : April 27, 2010
INVENTOR(S) : Akihito Koike et al.

It is certified that error appears in the above-identified patent and that said Letters Patent is hereby corrected as shown below:

ON THE TITLE PAGE, ITEM (54) AND AT COLUMN 1, LINES 1 AND 2,

Please amend the title as follows:

ROTARY ELECTRIC MACHINE AND STATOR
    COIL <u>FOR</u> ROTARY ELECTRIC MACHINES

Signed and Sealed this

Third Day of August, 2010

David J. Kappos
*Director of the United States Patent and Trademark Office*